(12) United States Patent
Schönenberger

(10) Patent No.: US 9,511,940 B2
(45) Date of Patent: Dec. 6, 2016

(54) CONVEYED GOODS CONTAINER FOR TRANSPORTING CONVEYED GOODS

(71) Applicant: RSL Logistik GmbH & Co. KG, Landsberg (DE)

(72) Inventor: Rolf Schönenberger, Landsberg (DE)

(73) Assignee: RSL Logistik GMBH & CO. KG, Landsberg (DE)

(\*) Notice: Subject to any disclaimer, the term of this patent is extended or adjusted under 35 U.S.C. 154(b) by 0 days.

(21) Appl. No.: 14/418,848

(22) PCT Filed: Jul. 17, 2013

(86) PCT No.: PCT/EP2013/065072
§ 371 (c)(1),
(2) Date: Jan. 30, 2015

(87) PCT Pub. No.: WO2014/012965
PCT Pub. Date: Jan. 23, 2014

(65) Prior Publication Data
US 2015/0225177 A1    Aug. 13, 2015

(30) Foreign Application Priority Data

Jul. 17, 2012  (DE) .................. 10 2012 212 518
Dec. 21, 2012  (DE) .................. 20 2012 012 331 U

(51) Int. Cl.
*B65G 17/20*   (2006.01)
*B65G 17/32*   (2006.01)
(Continued)

(52) U.S. Cl.
CPC .............. *B65G 17/32* (2013.01); *B65G 9/002* (2013.01); *B65G 9/004* (2013.01); *B65G 17/20* (2013.01); *B65G 17/485* (2013.01); *B65G 19/025* (2013.01)

(58) Field of Classification Search
CPC ........ B65G 19/025; B65G 47/61; B65G 17/20
See application file for complete search history.

(56) References Cited

U.S. PATENT DOCUMENTS 8,490,774 B2 \* 7/2013 Janzen ................ B65G 19/025
198/384
8,607,963 B2 \* 12/2013 Wend .................. B65G 19/025
141/250
8,672,118 B2 \* 3/2014 Janzen ................ B65G 47/61
198/678.1

FOREIGN PATENT DOCUMENTS

DE        9101858 U1    6/1992
DE        10354419 A1   6/2005
(Continued)

OTHER PUBLICATIONS

German Search Report for German Application No. 10 2012 212 518.3 dated Jan. 30, 2013.
(Continued)

*Primary Examiner* — Thomas Randazzo
(74) *Attorney, Agent, or Firm* — Sutherland Asbill & Brennan LLP

(57) ABSTRACT

Systems, devices, and methods are disclosed for a conveyed goods container and for transporting conveyed goods in a suspended conveyor. The conveyed goods container may be a suspended bag having a conveyed goods receiving region which is delimited on one side by a side wall element and having a suspension element for suspension from a suspended conveyor. The suspension means may be fastened to the side wall element in such a manner that it is pivotable about a pivot device defining a pivot axis, wherein, for the purpose of good loadability and impact protection for the conveyed goods, the conveyed goods receiving region is delimited on a further side by a second side wall element. The second side wall element may be connected to the
(Continued)

Figure 1:
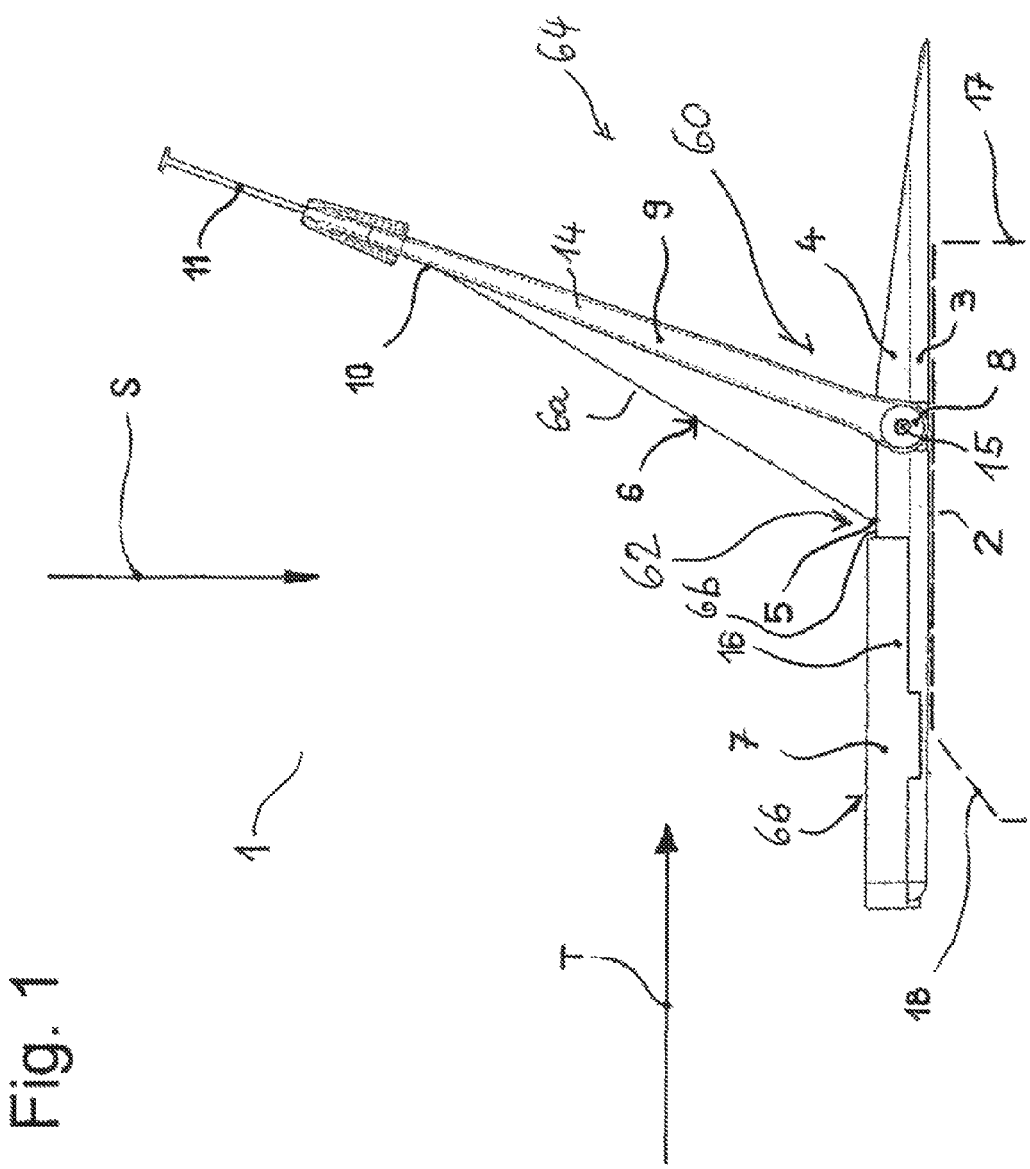

suspension element such that, when the suspension element is pivoted relative to the first side wall element from a transport position into an open position, the second side wall element can be removed from the side wall element so that the conveyed goods receiving region opens.

21 Claims, 20 Drawing Sheets

(51) Int. Cl.
    *B65G 17/48*     (2006.01)
    *B65G 9/00*     (2006.01)
    *B65G 19/02*     (2006.01)

(56) References Cited

FOREIGN PATENT DOCUMENTS

| | | | | |
|---|---|---|---|---|
| DE | 102004018569 | * | 11/2005 | ............. B65G 17/20 |
| DE | 102004018569 | A1 | 11/2005 | |
| DE | 102010053590 | A1 | 6/2012 | |
| EP | 1420105 | A1 | 5/2004 | |
| EP | 2130968 | A1 | 12/2009 | |
| EP | 2196415 | A2 | 6/2010 | |
| EP | 2418160 | A1 | 2/2012 | |
| GB | 258094 | A | 9/1926 | |
| GB | 1164813 | A | 9/1969 | |

OTHER PUBLICATIONS

International Search Report for International Application No. PCT/EP2013/065072 dated Sep. 13, 2013.

* cited by examiner

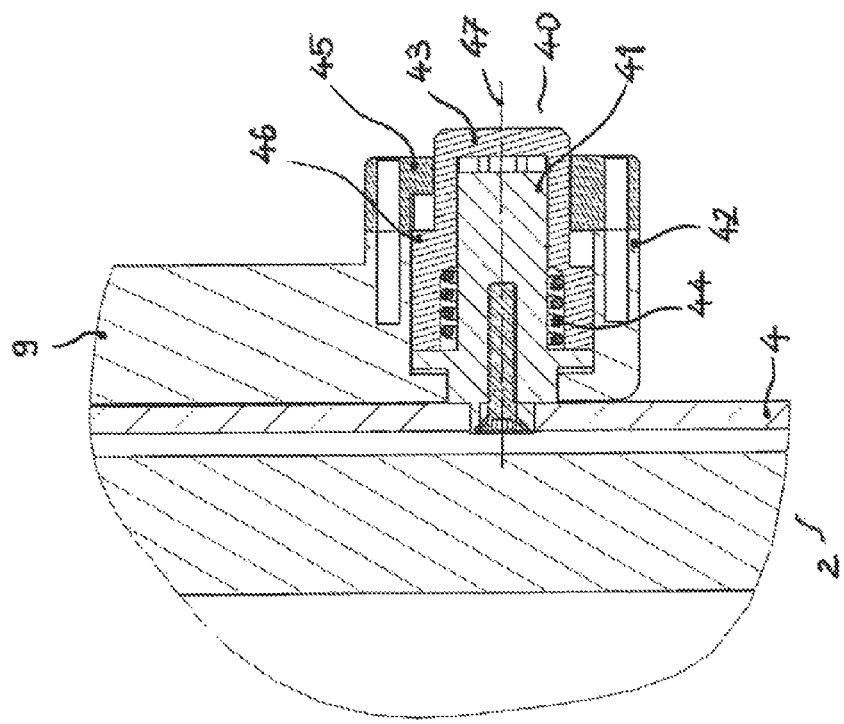
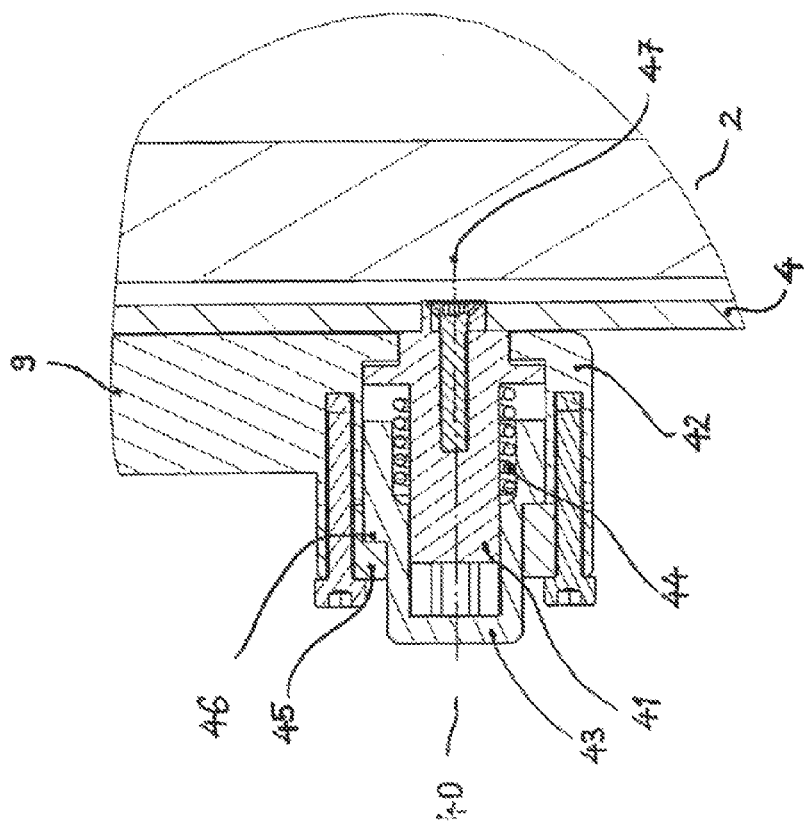
Fig. 7a
Fig. 7b

CONVEYED GOODS CONTAINER FOR TRANSPORTING CONVEYED GOODS

CROSS-REFERENCE TO RELATED APPLICATIONS

This application is a U.S. National Stage Application under 35 U.S.C. 371 and claims the priority benefit of International Application No. PCT/EP2013/065072 filed Jul. 17, 2013, which claims priority to German Application No. 10 2012 212 518.3 filed Jul. 17,2012, and German Application No. 20 2012 012 33.9 filed Dec. 21, 2012. the contents of each of the foregoing applications are hereby incorporated herein by reference in their entirety.

This invention relates to a suspended bag as a conveyed goods container for transporting conveyed goods in a suspended conveyor, having a first bag side wall and a second bag side wall which, facing one another, delimit between them a conveyed goods receiving region and which are connected together in a hinged connection region in such a manner that they can be folded apart and folded together for opening and closing the conveyed goods receiving region, so that they form a jaw-like bag opening, and having a suspension means for suspending the suspended bag from a suspended conveyor in a transport position with the bag opening at the top.

In automated warehouses, production plants and when transporting goods in general, it is necessary quickly to pick up conveyed goods in conveyed goods containers manually or automatically, to transport the conveyed goods by means of the conveyed goods container via a suspended conveyor, for example, to their intended location, and there to unload them from the conveyed goods containers again. For that purpose, various conveyed goods containers and associated suspended conveyors have been developed and described in the past, for example in German Offenlegungsschrift 10 2004 018 569 A1, European patent application SP 2 130 968 A1 or European patent application SP 2 196 415 A2. The transport bags described therein consist of flexible material in the form of a loop, in which the conveyed goods are held. For loading, the transport bags are opened at the top in order to enable conveyed goods to be introduced into the loop. The receiving opening has only a limited size. For unloading the conveyed goods from the transport bag, they can be removed or discharged from the loop at the side. According to SP 2 130 968 A1, the loop can be opened at the bottom so that the conveyed goods are able to fall downwards out of the transport bag.

The described solutions have a number of disadvantages. The conveyed goods are always located at the bottom of the flexible loop. In the case of impacts, for example when transferring the transport bag between different transport systems, when travelling over uneven regions in the conveyor track or the like, the impacts are transmitted directly to the conveyed goods. The conveyed goods can then easily slip in the conveyed goods carrier, and a plurality of conveyed articles in a conveyed goods carrier may thereby hit one another, which increases the risk of damage. Furthermore, the size of the opening for receiving transported goods is limited, so that they can be introduced into the transport bag only with difficulty and carefully and generally fall from the upper entrance downwards into the flexible loop. This can also lead to considerable stress on the conveyed goods. Furthermore, owing to the fixed size of the opening, the maximum size of the conveyed goods to be transported is limited to a relatively small dimension. Moreover, transported goods can fall out of the loop at the side, which further impairs the security of the conveyed goods. Not least, small conveyed goods in particular are not necessarily enclosed securely by the loop, so that they can fall out of the loop particularly easily.

Accordingly, the object of the invention is to improve suspended bags, suspended conveyors and transport methods according to the prior art by a conveyed goods container in the form of a novel suspended bag which avoids the disadvantages mentioned above and in particular can easily be loaded and is able to ensure a reduced impact load and improved security against falling out for conveyed goods of very different sizes.

The invention provides a conveyed goods carrier in the form of a suspended bag of the type mentioned at the outset, wherein the suspended bag has a first suspended bag side wall and a second suspended bag side wall which, facing one another, delimit between them a conveyed goods receiving region and which are connected together in a hinged connection region in such a manner that they can be folded apart and folded together for opening and closing the conveyed goods receiving region, so that they form a jaw-like bag opening, wherein there is further provided a suspension means for suspending the suspended bag from a suspended conveyor in a transport position with side walls projecting upwards from the hinged connection region and the bag opening accordingly being at the top. The suspended bag according to the invention is characterised in that the first bag side wall has at least a rigid edge contour region and is connected in that region to the suspension means in such a manner that it is pivotably about a pivot axis which runs at least approximately horizontally in the transport position of the suspended bag, and in that the second bag side wall is connected to or can be acted upon by the suspension means at a point that is remote from the pivot axis and the hinged connection region, in such a manner that, by pivoting the first bag side wall relative to the suspension means about the pivot axis, the bag side walls can be folded apart and folded together.

The suspended bag is in such a form that it can be opened at a loading station or unloading station, optionally while remaining on the suspended conveyor, from its transport position associated with the closed position, namely by pivoting the first bag side wall from its upwardly directed position about the preferably horizontal pivot axis. The first bag side wall can thereby be brought into an at least approximately horizontal position. During this pivot movement of the first bag side wall, the suspended bag is automatically opened because the second bag side wall is so acted upon by the upwardly directed suspension means suspended from the suspended conveyor that it is unable to follow the pivot movement of the first bag side wall to a relevant degree.

The suspended bag according to the invention can be in such a form that the side walls are oriented, for example, at an angle of 90° to one another in the position of maximum opening of the suspended bag, it being possible for the first bag side wall to serve, for example, as a horizontal support for loading with new conveyed goods. A large width of the bag opening achieved in that manner permits considerably simplified loading of the bag even with relatively large conveyed goods, either manually or automatically. Removal of conveyed goods from the conveying bag is likewise possible relatively simply.

For unloading conveyed goods, it is also possible according to a variant of the invention for the first bag side wall to be pivoted about the pivot axis in such a manner that it assumes a downward inclination in order to allow conveyed goods to fall or slide out of the suspended bag.

If conveyed goods have been placed on the first bag side wall during loading of the suspended bag, the first bag side wall can be pivoted back into an upwardly directed position again, as a result of which the two side walls are folded together and the conveyed goods are enclosed by the two bag side walls. This can be carried out in such a manner that the conveyed goods are fixed to a greater or lesser degree in their positions in the conveyed goods receiving region and accordingly cannot perform any uncontrolled movements inside the suspended bag during transport in the suspended conveyor. A plurality of conveyed articles in the suspended bag are thus prevented from hitting one another.

According to a particularly preferred embodiment of the invention, the first bag side wall has or is in the form of a tray with a tray plane, wherein the first bag side wall is pivotably connected to the suspension means at the tray, and the pivot axis runs in the tablet plane or in a plane extending parallel thereto. "Tray" here refers to a preferably flat wall region with a smooth or, if required, non-slip surface, which can serve as a fixed support for conveyed goods during loading of the suspended bag. It is preferably a sheet of a dimensionally stable plastics material, or rigid plastics material. In one embodiment, it is provided that the tray has a trough-like depression in the middle. Such a depression serves to center small conveyed objects in the middle of the tray during loading of the suspended bag. According to a further variant, the tray can be formed by a film of textile and/or plastics material clamped in a frame.

Such a tray solution also permits horizontal transport, the suspended bag being transported on a conveyor belt with the tray bottom most. It can thereby be uncoupled from a guide rail of the suspended conveyor or alternatively can continue to be coupled thereto.

In one embodiment of the invention, at least one of the bag side walls has on the inside a compartment structure with depressions for receiving correspondingly small conveyed articles, which can be particularly well protected when transported in the depressions. The compartment structure can comprise, for example, a kind of studded structure of elevations and hollows. In a further development of this aspect of the invention, the compartment structure is made of a resiliently dimensionally flexible material. This can be, for example, a foam mat or the like which has a compartment structure and is adhesively bonded or otherwise fixed to the tray of the first bag side wall. In the closed position (=transport position) of the suspended bag, the compartment structure faces the second bag side wall, so that the second bag side wall is able to enclose any conveyed articles received in depressions of the compartment structure during transport in the suspended conveyor. The depressions can have different dimensions in order to be able to accommodate articles of different sizes therein. The compartment structure thus forms a conveyed goods position fixing element.

As mentioned, the tray is to be dimensionally stable, wherein the second bag side wall can have a wall region which faces the tray of the first bag side wall and has at least limited dimensional flexibility. Such an embodiment has the advantage that the dimensionally flexible wall region is readily able to adapt to the contour of the conveyed goods received in the suspended bag and can mould thereto in order to fix them in position. Such a solution also makes it possible to provide a conveyed goods receiving region which is flexibly variable in terms of its volume, and thus secure transport of conveyed goods of different volumes.

The dimensionally flexible wall region can be formed of a dimensionally loose material, for example a cloth of textile material. Preferably, however, a dimensionally flexible wall region of a resiliently flexible material, in particular a resiliently deformable plastics film, is used. The second bag side wall can thus comprise a conveyed goods position fixing element or can itself form such an element. According to a particularly preferred embodiment of the invention, the second bag side wall and/or the first bag side wall accordingly comprises or forms at least a second side wall element for fixing conveyed goods in position in the conveyed goods receiving region.

The first bag side wall is also referred to as the first side wall element hereinbelow. Analogously, the second bag side wall is also referred to as the second side wall element.

According to a further development of the invention, the suspended bag has a position locking device by means of which the suspension means and the first side wall element can be reversibly locked relative to one another in terms of pivoting about the pivot axis. The position locking device serves to prevent accidental opening of the suspended bag from its transport position on the suspended conveyor. Corresponding securing means can also be provided between the two bag side walls to prevent opening.

In a particularly preferred embodiment, such a position locking device is configured to release the locking between the first bag side wall and the suspension means when the suspended bag is placed in its transport position on a support or comes up against a stop in a specific position. In this manner, the operation of opening the suspended bag can easily be automated, opening of the suspended bag being possible by simple means once the locking has been released.

In a further aspect of the invention, a conveyed goods container for transporting conveyed goods in a suspended conveyor is proposed, wherein the conveyed goods container is in the form of a suspended bag having a conveyed goods receiving region which is delimited on one side by a first side wall element, wherein the conveyed goods container has a suspension means for suspension from a suspended conveyor, and the suspension means is fastened to the first side wall element by means of a pivot device in such a manner that it is pivotably about a pivot axis, wherein the conveyed goods receiving region is delimited on a further side by a second side wall element which is preferably in the form of a conveyed goods position fixing element, wherein the second side wall element is connected to the suspension means in such a manner that, when the suspension means is pivoted relative to the first side wall element from a transport position into an open position, the second side wall element can be removed from the first side wall element so that the conveyed goods receiving region opens.

The pivot axis thereby means a theoretical pivot axis.

Pivoting into an open position is not necessarily to be understood as meaning complete opening, but a movement from a closed position towards an open position. Preferably, the conveyed goods receiving region closes when the suspension means is pivoted relative to the first side wall in a direction counter to the mentioned opening direction. The suspension means can be a multi-part suspension means. It connects the first side wall element to a suspension point. The second side wall element, together with the first side wall element, serves to hold conveyed goods in the conveyed goods receiving region. Preferably, it additionally fixes conveyed goods in position inside the conveyed goods receiving region. It may be sufficient for the conveyed goods to be fixed in only one direction, for example in a direction away from the first side wall, for example in the case of very flat conveyed goods which can move in the conveyed goods receiving region in a plane of the first side wall. Particularly preferably, however, the second side wall element, as the conveyed goods position fixing element, fixes conveyed goods in every direction inside the conveyed goods receiving region.

Advantages of the mentioned structure of the conveyed goods container include a simple construction, which results in inexpensive manufacture. In addition, the conveyed goods container can easily be loaded owing to the opening of the conveyed goods receiving region in the open position. Furthermore, the second side wall elements can slow down conveyed goods that are thrown into the conveyed goods container, so that they can slip gently into a position in the conveyed goods receiving region. The stress on the conveyed goods during loading is therefore reduced.

Opening and closing of the conveyed goods receiving region is achieved by means of the fastening of the second side wall element to the suspension means, a fastening point of the second side wall element to the suspension means being removed from the first side wall element upon pivoting and the second side wall element thus likewise being removed from the first side wall element. In the transport position, the first side wall element is preferably oriented substantially in the direction of gravity or, when loaded with large-volume conveyed goods, optionally obliquely upwards, when the conveyed goods container is suspended from the suspension means. In the open position, the first side wall element is preferably oriented substantially perpendicularly to the direction of gravity. Preferably, in the open position, an arrangement of the first side wall at an angle to the second side wall element results in an introduction slope, by which the conveyed goods are guided into their transport position upon introduction into the conveyed goods receiving region. Loading of the conveyed goods container is advantageously facilitated thereby.

In this application, the content of German patent application DE 10 2012 212 518.3 is to be considered incorporated by reference. In particular, the embodiments described therein which achieve the object of the present invention at least in part, and the details thereof, even if these are not disclosed independently of one another in DE 10 2012 212 518.3, are to be considered as independent features of this application. This relates in particular to the mechanisms with which conveyed goods can be enclosed by the described conveyed goods containers, and advantageous further developments therefore. All the embodiments of DE 10 2012 212 518.3 incorporated by reference in this manner can be combined with all the features of the present application to form novel embodiments, provided that a skilled person would consider such a combination. This relates in particular to a position locking system for an open position and/or a transport position of a conveyed goods container.

In a further embodiment, the first side wall element is arranged substantially parallel to the second side wall element in the transport position of the unloaded conveyed goods container. In the transport position, the first side wall element and the second side wall element are preferably as close to one another as possible. Because the conveyed goods receiving region is located between the first side wall element and the second side wall element, the maximum possible closeness has the effect that even small conveyed goods can be received securely between the two mentioned elements.

In a further embodiment, a center of mass of the first side wall element and of the second side wall element is arranged, in the unloaded state of the conveyed goods container, from the pivot axis, in the direction of an end of the first side wall element that is remote from the suspension means in the transport position. Such an arrangement of the pivot axis has the effect that the center of mass of the combination of the side wall elements, in conjunction with gravity, leads to the first side wall element automatically tending to be oriented in the direction of gravity, as a result of which the conveyed goods container is transferred to its transport position. As a consequence thereof, the suspension means is pivoted relative to the first side wall element in such a manner that the second side wall element is tensioned between the suspension means and the first side wall element, so that conveyed goods introduced into the conveyed goods receiving region between the first side wall element and the second side wall element are pressed against the first side wall element by the second side wall element and thus fixed. Preferably, the pivot axis is arranged at the end of the first side wall element that faces the suspension means in the transport position. The closing moment produced between the center of mass and the pivot axis is maximum in this arrangement. In order to achieve a smaller closing moment, the pivot axis can be arranged further towards the center of mass. In a further embodiment, by loading the conveyed goods container, the center of mass can also be displaced towards the side of the pivot axis that is remote from the suspension means in the transport position, so that a turning moment is produced in the direction of the transport position of the conveyed goods container.

In yet a further embodiment of the conveyed goods container, the pivot axis is arranged close to a conveyed goods support surface of the first side wall element that faces the conveyed goods receiving region or on the side of the first side wall element that is remote from the conveyed goods receiving region. By means of such an arrangement of the pivot axis, loading of the conveyed goods container with conveyed goods leads to a displacement of the center of mass from the plane of the conveyed goods support surface of the first side wall element towards the second side wall element, which again has the result, in the transport position, that the closing moment is increased. As a result, the conveyed goods container is less easily able to open, for example through vibrations on a transport rail or the like, so that increased security against slipping or dropping of the conveyed goods is obtained. This effect is all the more pronounced, the further the pivot axis is arranged from the conveyed goods support surface in the direction towards the side of the first side wall element that is remote from the conveyed goods receiving region, in particular when the pivot axis is arranged on the side of the side wall element that is remote from the conveyed goods receiving region.

In a further embodiment of the conveyed goods container, the second side wall element is fastened to the first side wall element, starting from the pivot axis, in a direction facing away from the suspension means in the transport position. In particular, the second side wall element is fastened at the very end of the first side wall element or is fastened between the pivot axis and the mentioned end of the first side wall element.

However, as a consequence of the method of fixing according to the above-described embodiment, pivoting of the first side wall element in relation to the suspension means also requires a length adjustment of the second side wall element if it is to be tensioned also in the open position and is to exhibit a pre-tensioning in the transport position. In one embodiment, a conveyed goods container is proposed which has a second side wall element that is flexible in terms of length. Owing to the flexibility, the second side wall element can be stretched, as a result of which it can be tensioned, as desired, both in the open position and in the transport position. The second side wall element in this case has a shorter length in the open position than it has in the transport position. Alternatively or in addition, this embodiment includes the possibility of providing as the length adjustment mechanism a suspension means which is variable in terms of length in the radial direction in relation to the pivot axis between a fastening point of the second side wall element to the suspension means and the pivot axis. It is then possible to provide a rigid second side wall element. The constraint, given by the kinematics, of the changing distance, with pivoting, between the fastening points of the second side wall element is then compensated by the suspension means which, for example, can be retracted telescopically or shortened by bending. The second side wall element can thereby remain tensioned in any pivot position. In yet a further variant of the conveyed goods container of this embodiment, the second side wall element can have a length which is greater than or equal to the distance between the fastening point of the second side wall element to the suspension means and the fastening point of the second side wall element to the first side wall element. The second side wall element can then not be tensioned in the open position, in particular can be slack. Preferably, the length of the second side wall element in this variant is such that it is tensioned, preferably lightly tensioned, in the transport position.

In a further embodiment of the conveyed goods container, between the fastening point of the second side wall element to the first side wall element and the end of the first side wall element that is remote from the suspension means in the transport position, over the conveyed goods support surface of the first side wall element, a portion of the conveyed goods receiving region that is at the bottom in the transport position is provided as a bag pocket which is delimited by the conveyed goods support surface and a bag upper side. Preferably, the bag pocket is closed at the sides that are not oriented in the direction of the suspension means in the transport position. The open side of the bag pocket in the direction of the suspension means in the transport position preferably merges into a portion of the conveyed goods receiving region between the first side wall element and the second side wall element. Particularly preferably, the bag upper side is formed from a portion of the second side wall element in which the second side wall element, behind its fastening point to the first side wall element, continues in the direction away from the suspension means in the transport position. The introduction slope, which is preferably formed by the second side wall element in the open position, preferably continues without transition into at least a portion of the bag upper side through a resilience of the second side wall element. The bag pocket is preferably delimited by three edges of the first side wall element which project over the conveyed goods support surface. Preferably, the bag upper side is fastened to the upper ends of the edges. The bag upper side is preferably formed from a flexible material, so that it can be made to bulge by conveyed goods having a height greater than the distance between the bag upper side and the conveyed goods support surface on the first side wall element. As a result, the position of conveyed goods inside the bag can be fixed even better. Preferably, the bag is provided substantially over the entire surface of the first side wall element from the fastening point of the second side wall element to the first side wall element in the direction away from the suspension means in the transport position.

In a further embodiment of the conveyed goods container, the second side wall element is a resilient film. Such a film can enclose conveyed goods in the transport position from one side partially or completely, the conveyed goods preferably at the same time being pressed against the conveyed goods support surface. In this manner, good position fixing can be achieved regardless of the size of the conveyed goods. The film does not have to have a closed surface. Examples of suitable materials are net-like textiles, such as knitted fabrics, woven fabrics, cloth, nonwoven, nets or the like, which, if the structure in itself is flexible, as in the case of a knitted fabric, for example, can be produced from non-flexible yarn, or can be produced from resilient yarn, which is advantageous and preferred in the case of woven fabrics and the like. Alternatively, the resilient film can comprise a resilient film material, such as, for example, a rubber strip, a latex film or another sufficiently flexible plastics film or the like.

When a film that is not closed is used, such as, for example, a net or net-like fabric or a transparent film, this has the advantage that the conveyed goods are visible through the second side wall element. In this manner, it is possible to check the contents, in particular as regards the type and nature of conveyed goods, in particular for damage.

According to a further embodiment of the conveyed goods container, the suspension means is in the form of a yoke, in particular a yoke having two limbs and a middle portion connecting the limbs. In particular, the yoke can consist of a plurality of parts, for example of two individual elements which converge, without being connected, at or close to a suspension point of the suspension means. Furthermore, a closed frame is also conceivable, through which frame preferably the first side wall element or portions thereof run. It is a common feature of the mentioned variants that they are able to connect two points on the first side wall element which are apart from one another with a suspension point. Preferably, those two points are located on mutually opposite edges of the first side wall element. The suspension means straddles the two points on the side wall element and connects them together, the suspension point preferably being connected to the connection between the two points on the first side wall element, for example by an arm of the suspension means. In the variant of the suspension means as a yoke, the two limbs and the middle portion form the connection between the two points on the first side wall element. An arm is preferably arranged on the middle portion.

In a further embodiment of the conveyed goods container, the suspension means is preferably in such a form that it lies substantially in a plane.

In a further embodiment, the conveyed goods container can be loaded and unloaded by the passage of conveyed goods through the suspension means. Because the suspension means the first side wall element, which is preferably oriented substantially perpendicularly to gravity during loading and/or unloading, is held by the suspension means preferably on both sides, the suspension means, in its connection of the two fastening points of the suspension element to the first side wall element, forms a gate which is stretched between the first side wall element and the suspension point. The conveyed goods receiving region is thereby located, from the gate, in the direction in which the second side wall element runs. Therefore, in order to load and unload conveyed goods, the conveyed goods in this embodiment must pass at least partially through the suspension means forming a gate. Closing of the gate by pivoting the suspension means into the transport position advantageously causes the conveyed goods receiving region to be closed and the second side wall element to be tensioned.

In a further embodiment, the pivot device is arranged at the end of the limbs of the suspension means. The ends of the limbs thereby preferably each form a joint with the first side wall element. Particularly preferably, the pivot device is in the form of two hinges, in which in each case a portion of the limbs, preferably the end of the limbs, is inserted through holes in the first side wall element. The holes in the side wall element are preferably located in an edge which projects relative to the conveyed goods support surface. Alternatively, projections of the side wall element can extend through holes in the limbs of the suspension means. These two alternative connections are in each case in rotatable form. Particularly preferably, the pivot device is in the form of two hinges.

In a further embodiment of the conveyed goods container, the first side wall element is in substantially rigid form. In this manner, the first side wall element forms a suitable counter-bearing for the pressing forces exerted by the second side wall element. In yet a further embodiment of the conveyed goods container, the first side wall element is substantially flat. This form is not complicated to produce and allows conveyed goods to be pressed by the second side wall element largely regardless of the shape of the conveyed goods. In yet a further embodiment of the conveyed goods container, the first side wall element is in the form of a tray having lateral edges at least in part. One edge thereby extends preferably from the pivot axis to the end of the first side wall element that is remote from the suspension means in the transport position, and preferably along that end. Preferably, the pivot device is provided in or on the edge. Preferably, the edge forms a portion of the bag pocket. Particularly preferably, the bag upper side in this case straddles the upper side of the edge.

In a further embodiment of the conveyed goods container, the conveyed goods container comprises a position locking device, by means of which the suspension means and the first side wall element can be reversibly locked relative to one another in terms of pivoting. Preferably, locking is effected by interlocking engagement within the position locking device and/or between the position locking device and the suspension means and/or the first side wall element. Particularly preferably, the suspension means can be locked relative to the first side wall element in the open position and/or the transport position of the conveyed goods container and/or in positions between the open position and the transport position of the conveyed goods container. Alternatively, locking can also be effected by friction or corresponding force-based connection between elements which are displace able relative to one another, one of which is connected to the first side wall element and the other to the suspension means. Combined force-based and interlocking position locking devices can also be used. The position locking device can have a mechanism for locking and unlocking. The position locking device can be used in conjunction with all the embodiments of the conveyed goods container that are described in this application and with the embodiments of conveyed goods containers that are described in DE 10 2012 212 518.3. The position locking device is a particular embodiment of the pivot device which provides a locking function in addition to the pivot function. Preferably, two position locking devices are provided on a conveyed goods container at a connection point between the suspension means and the first side wall element.

In a further aspect of the present invention, a transport rail for a conveyed goods container according to any of the preceding claims is proposed, wherein the transport rail is suitable for receiving the suspension means and has an incline in a transport direction, before a loading station is reached, by means of which the suspension means of a conveyed goods container can be accelerated. Such an acceleration causes the suspension point of the suspension means to move ahead and accordingly effects an inclined position of the conveyed goods container. This inclined position can have the effect that the conveyed goods container undergoes a forward tilt and accordingly approaches more gently a loading station which brings the conveyed goods container into a horizontal loading position. The conveyed goods container is at the same time brought into its open position. In addition, the acceleration can effect separation of a plurality of conveyed goods containers transported close to one another.

In yet a further aspect of the present invention there is proposed a loading station for a conveyed goods container according to one of the embodiments described above, wherein the loading station is arranged beneath a transport rail for receiving a conveyed goods container according to the invention, and an upper edge of a side of the loading station that is oriented in the opposite direction to the transport direction of the conveyed goods container has a chamfer or rounded portion over which a conveyed goods container can be moved during transfer to its open position in the transport rail. Such a chamfer or rounded portion has the effect that opening of the conveyed goods container takes place without wear and without noise. The chamfer or rounded portion is preferably additionally suitably cushioned in order to receive the incoming conveyed goods container more gently.

Preferably, the loading station has a suitable height, so that the side wall element can be brought into a position substantially perpendicular to gravity, while the suspension point of the suspension means is located in the transport rail above the conveyed goods container.

In a further aspect of the present invention there is proposed according to claim 14 a suspended conveyor system which comprises a conveyed goods container according to one of the embodiments described above, a transport rail according to an above-described aspect of the invention and/or a loading station according to an above-described aspect of the invention.

Figure 2:
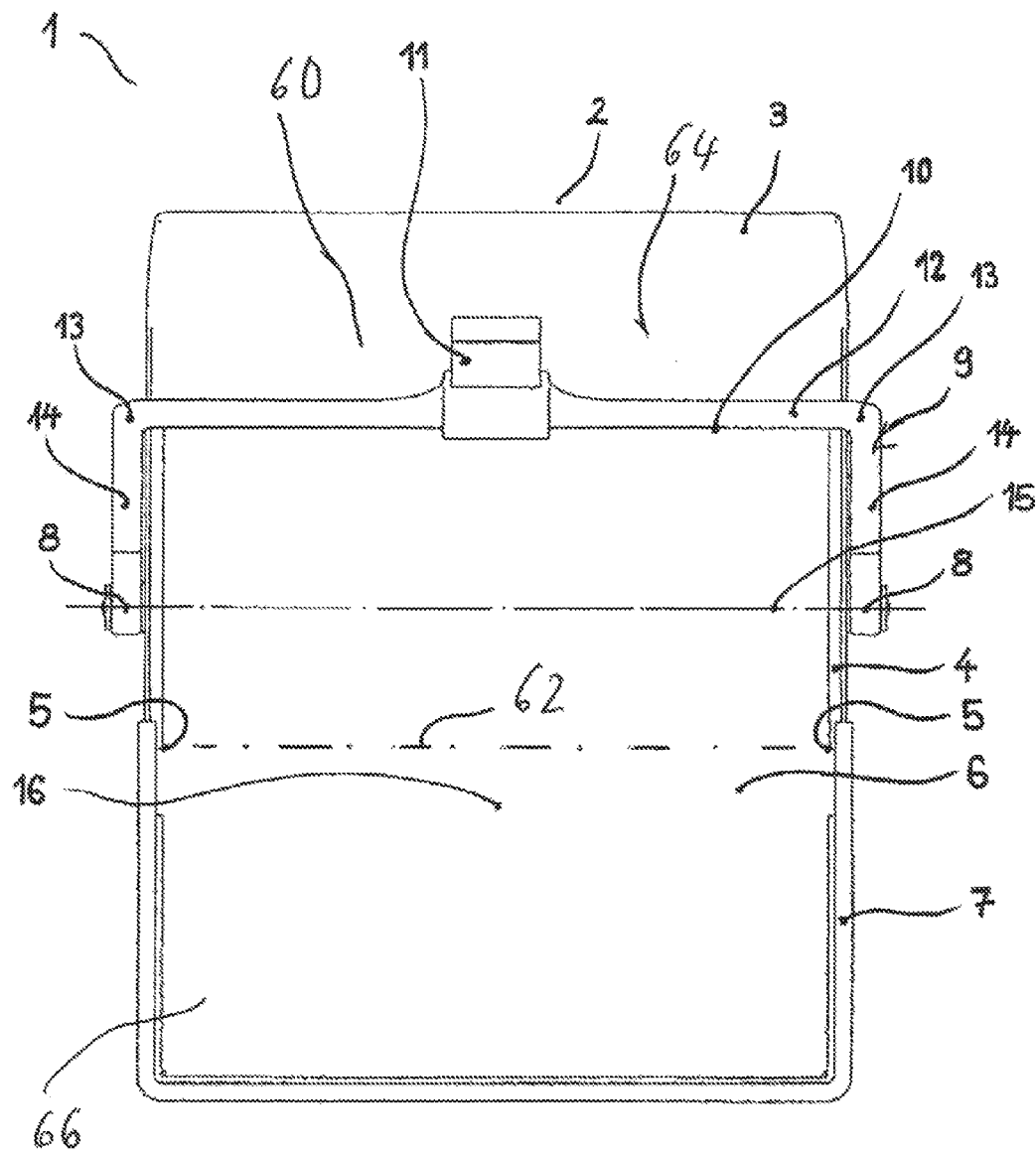
Figure 3:
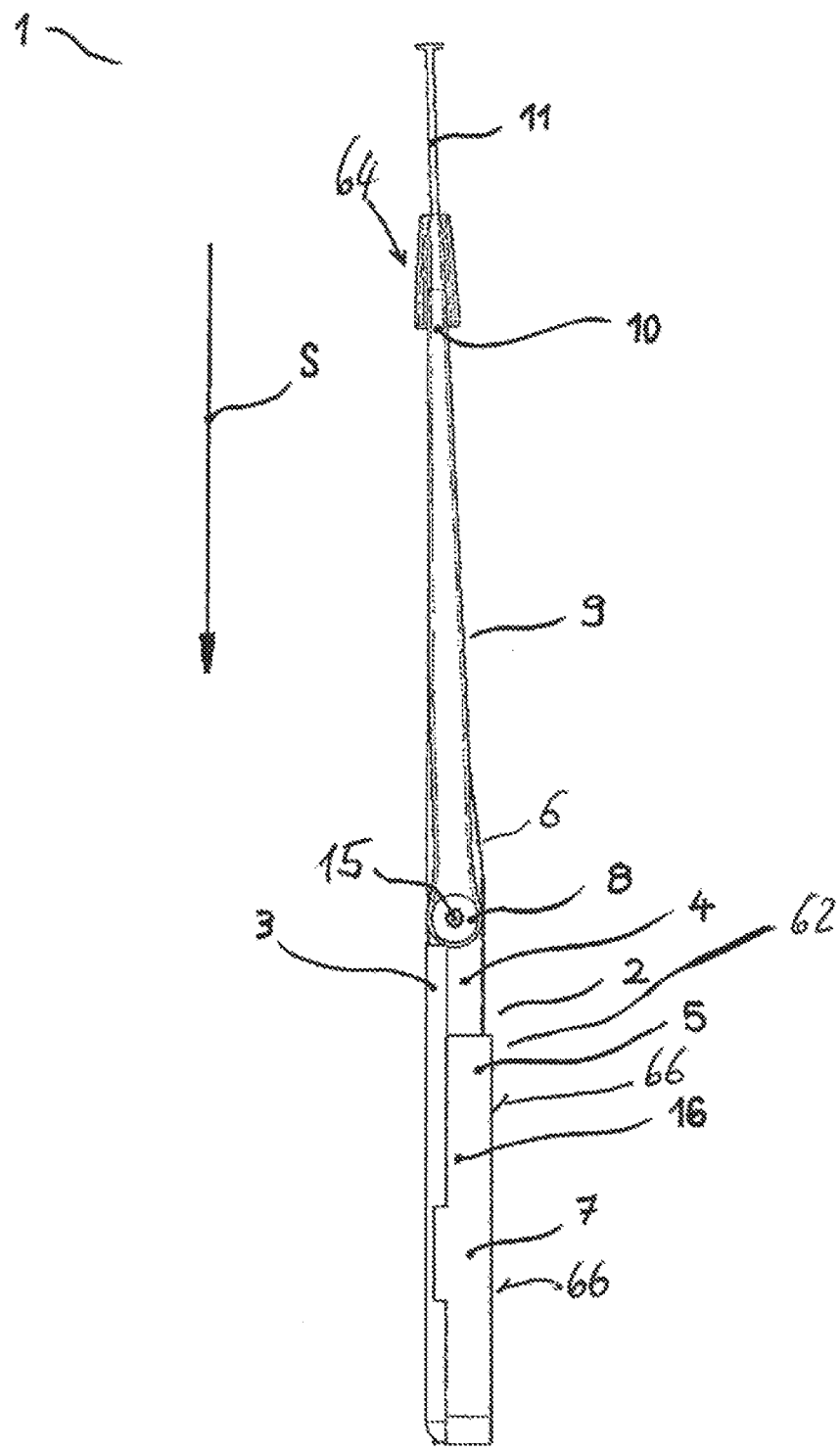
Figure 4:
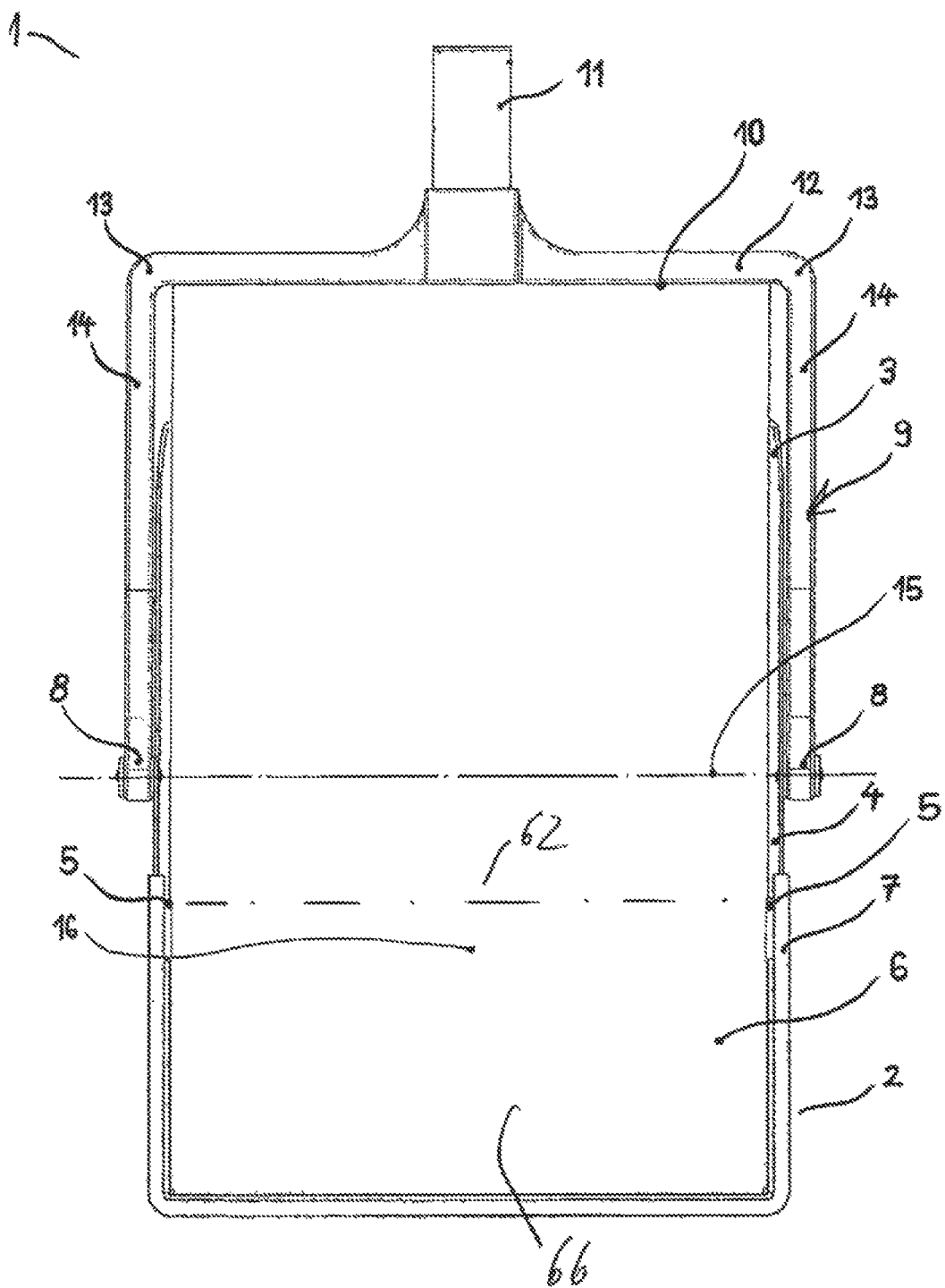
Figure 5:
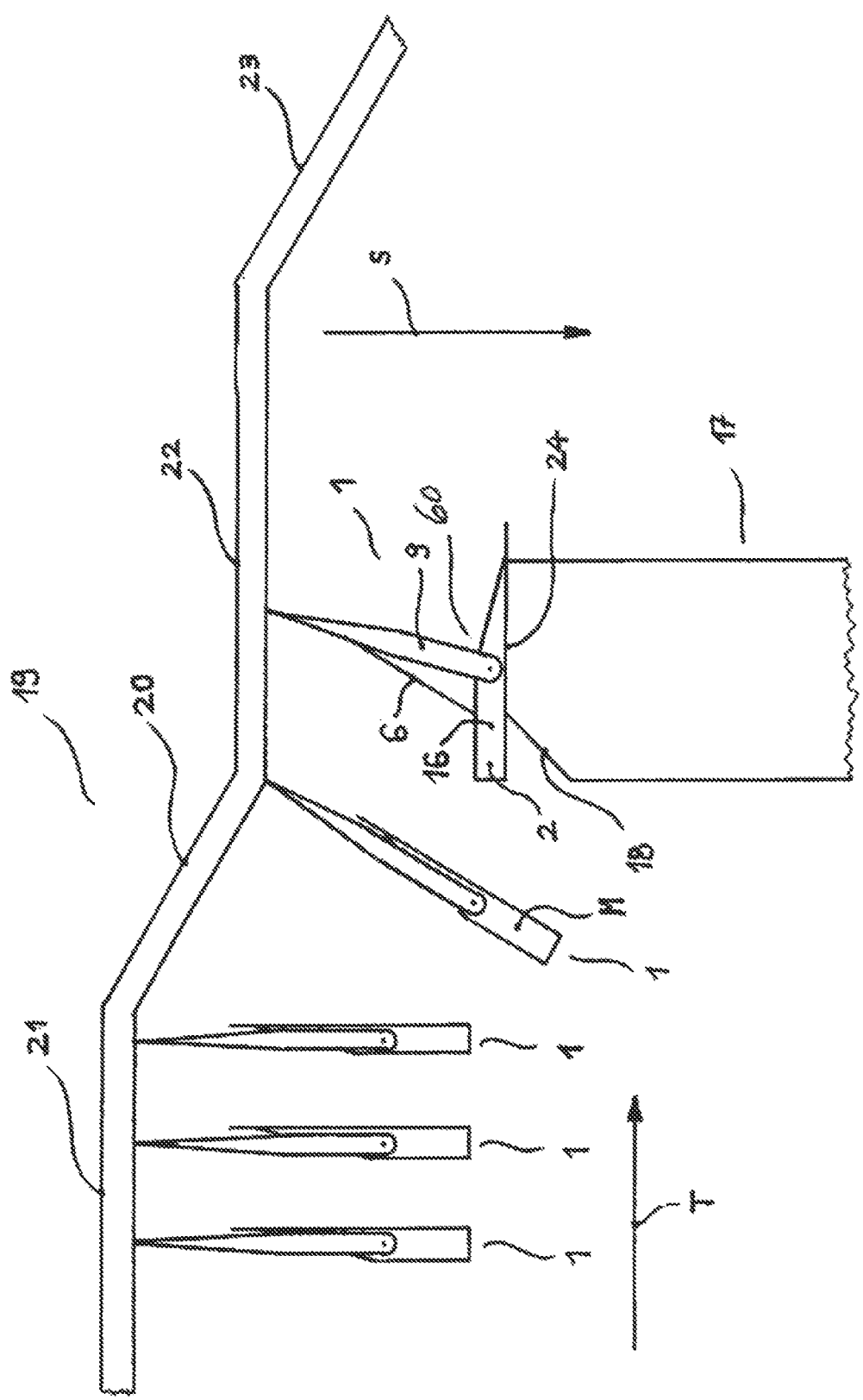
Figure 6A:
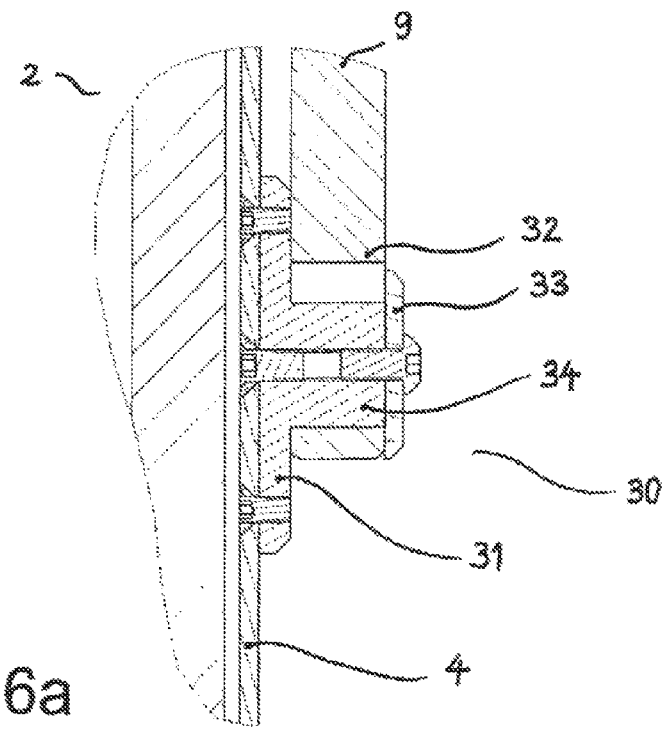
Figure 6B:
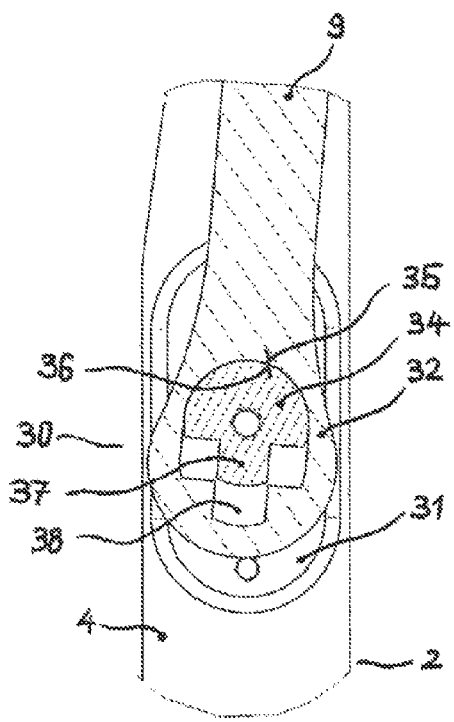
Figure 6C:
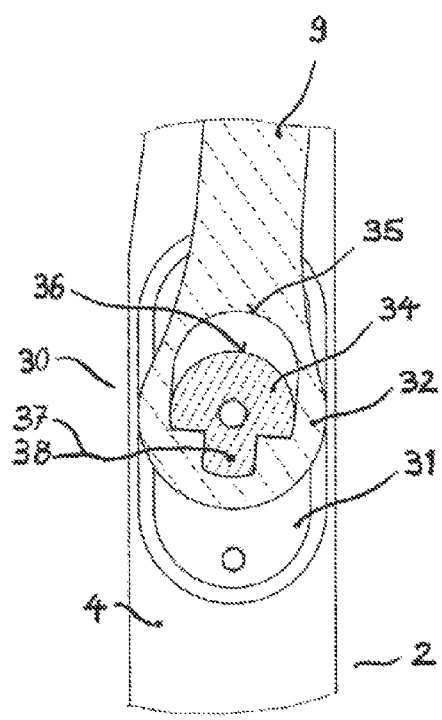
Figure 8A:
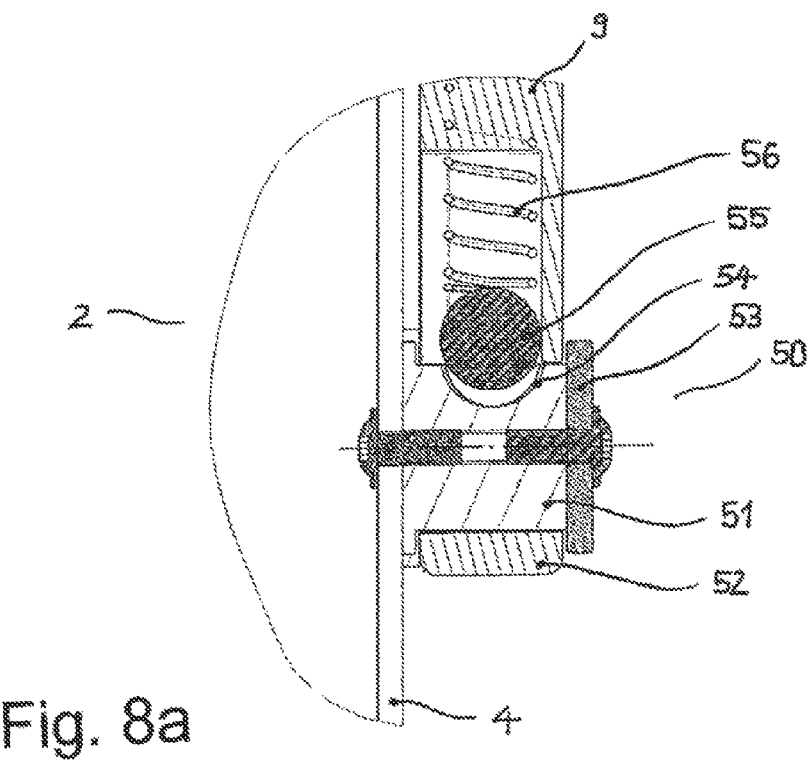
Figure 8B:
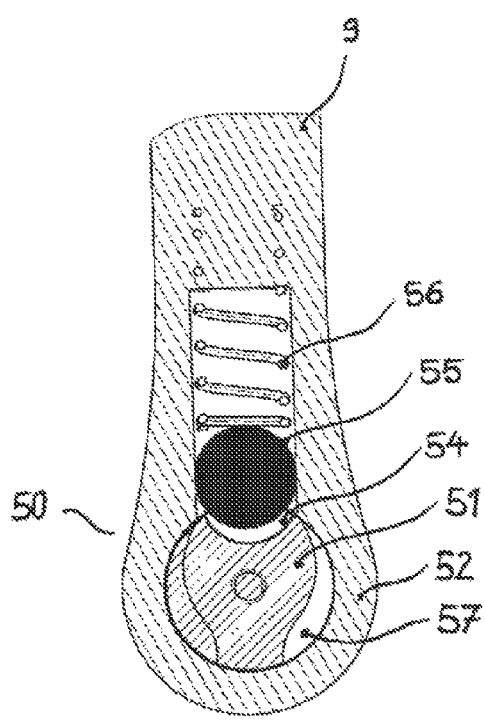
Figure 8C:
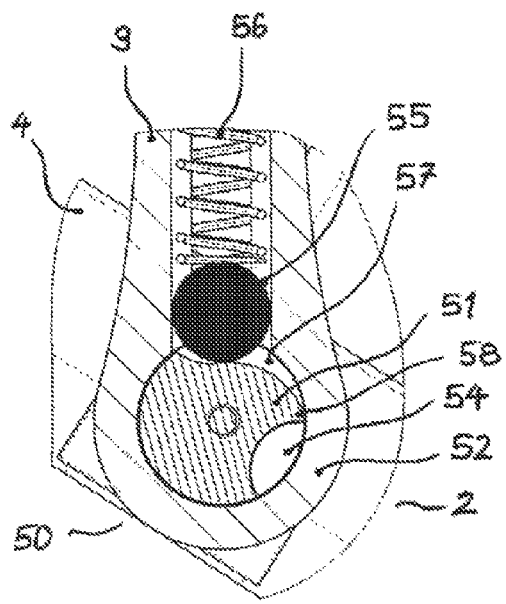
Figure 9:
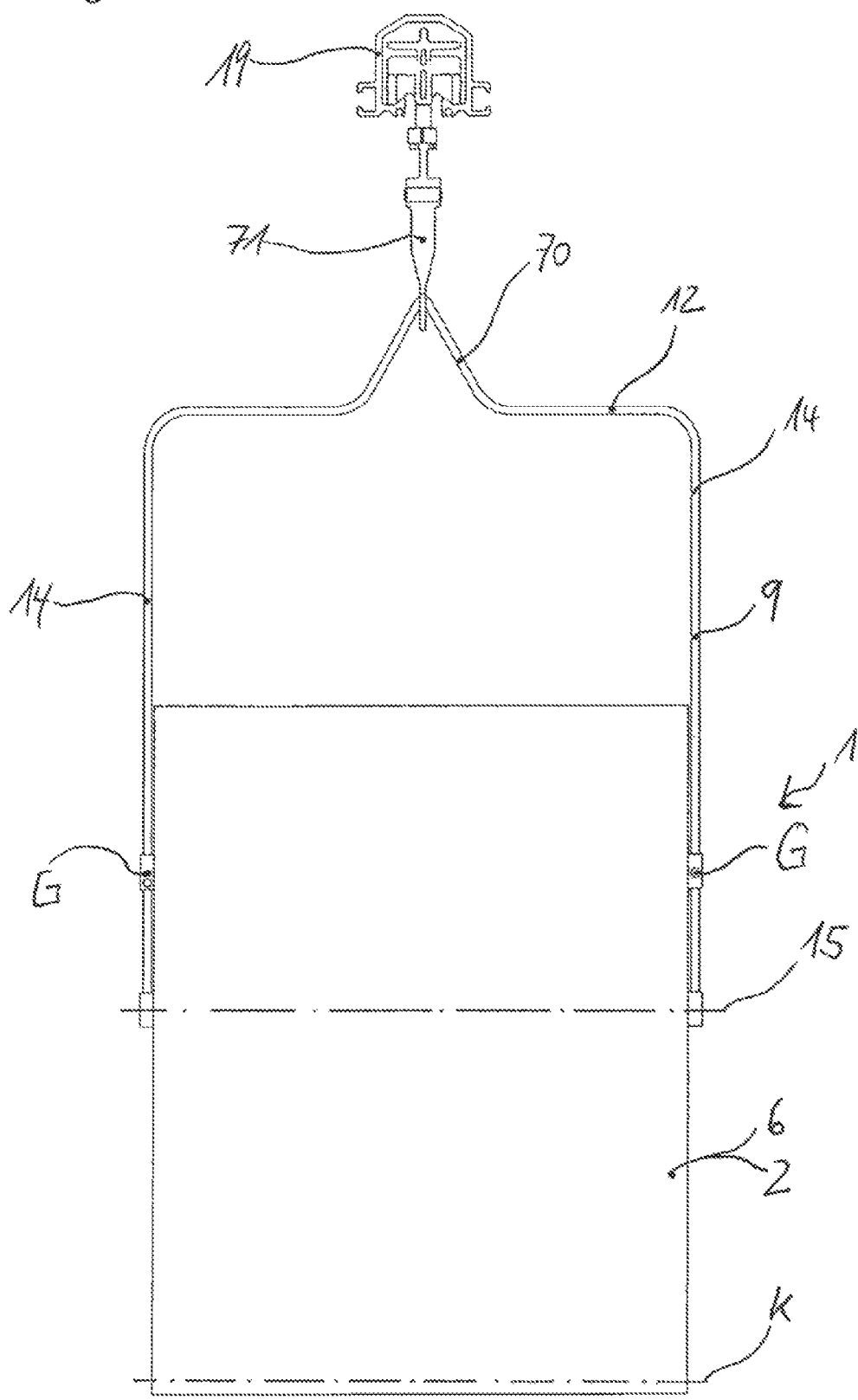
Figure 10:
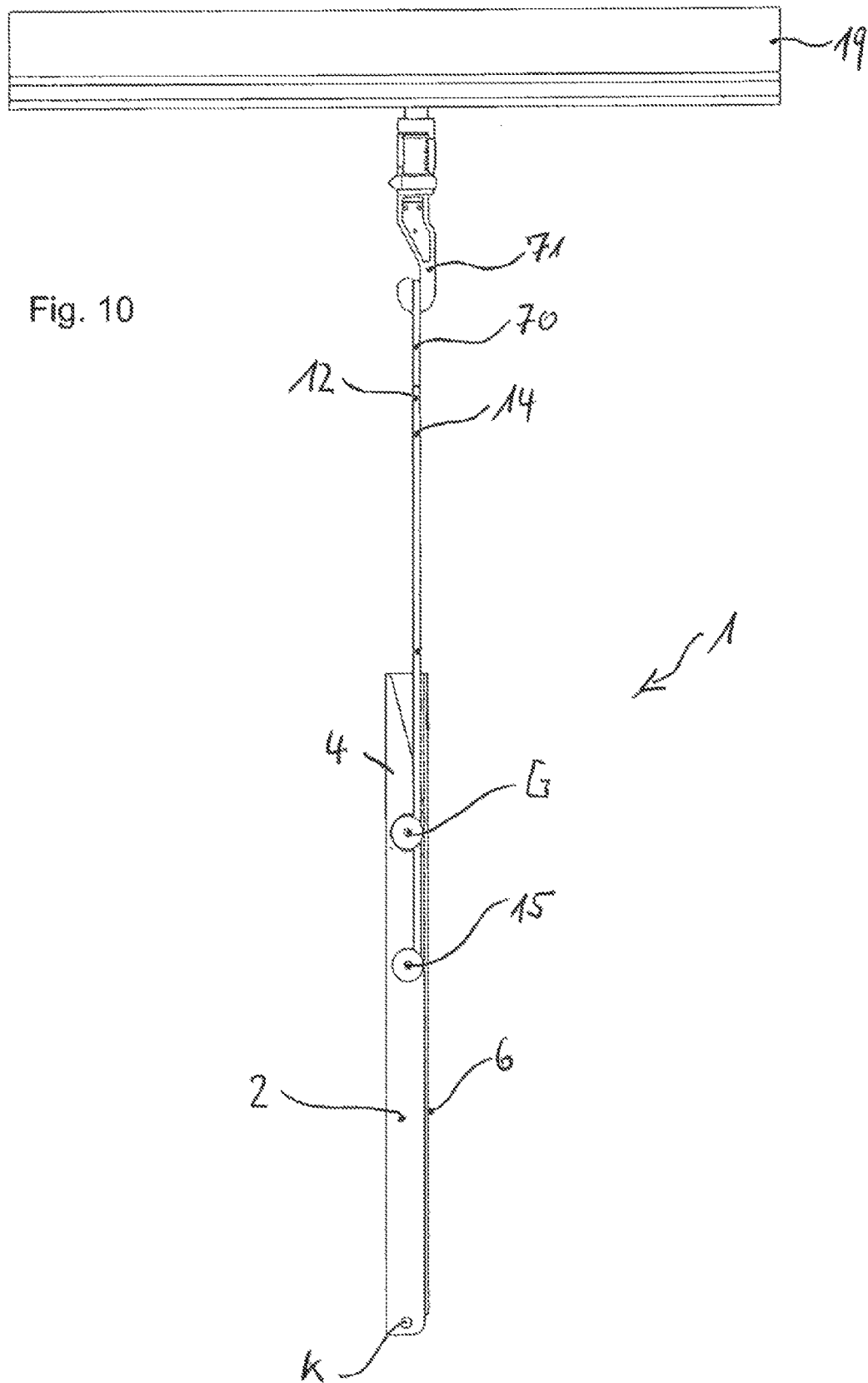
Figure 11:
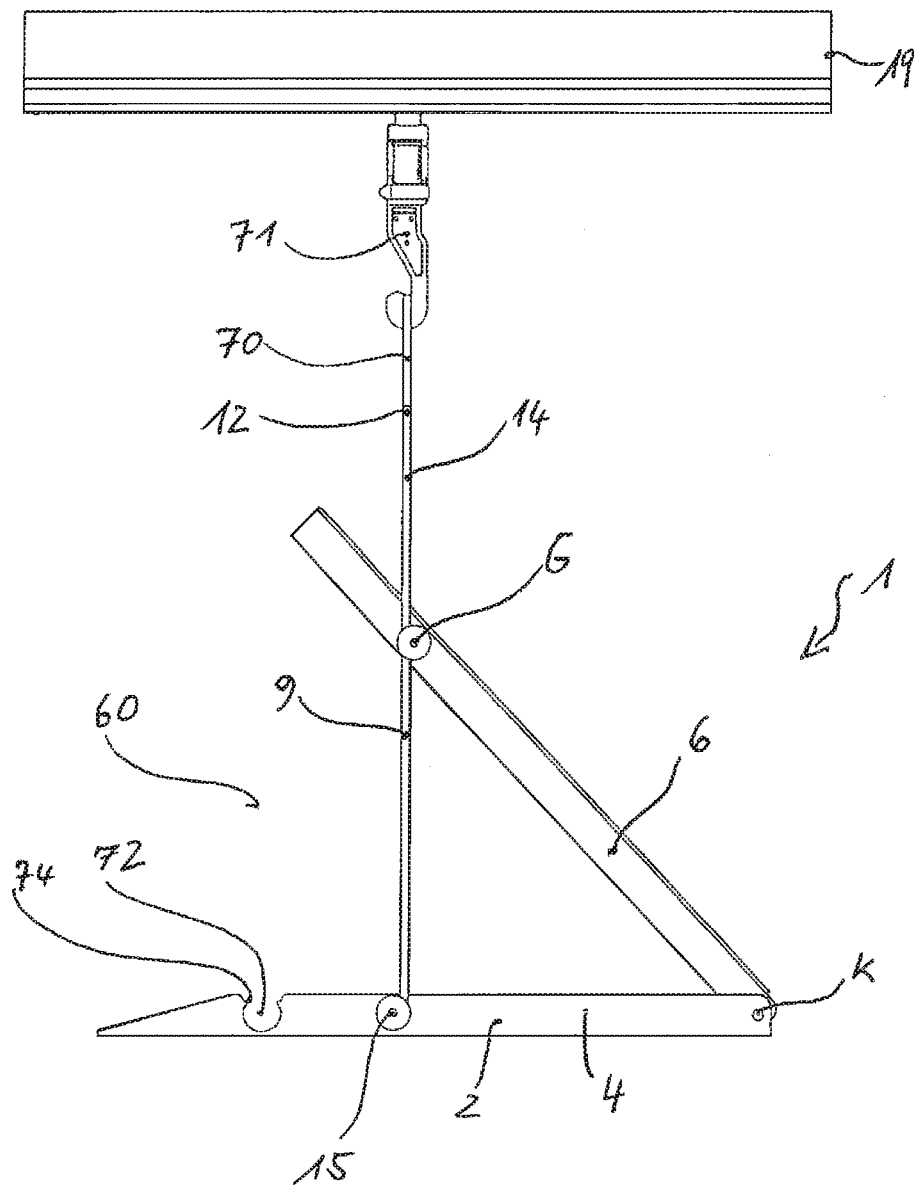
Figure 12:
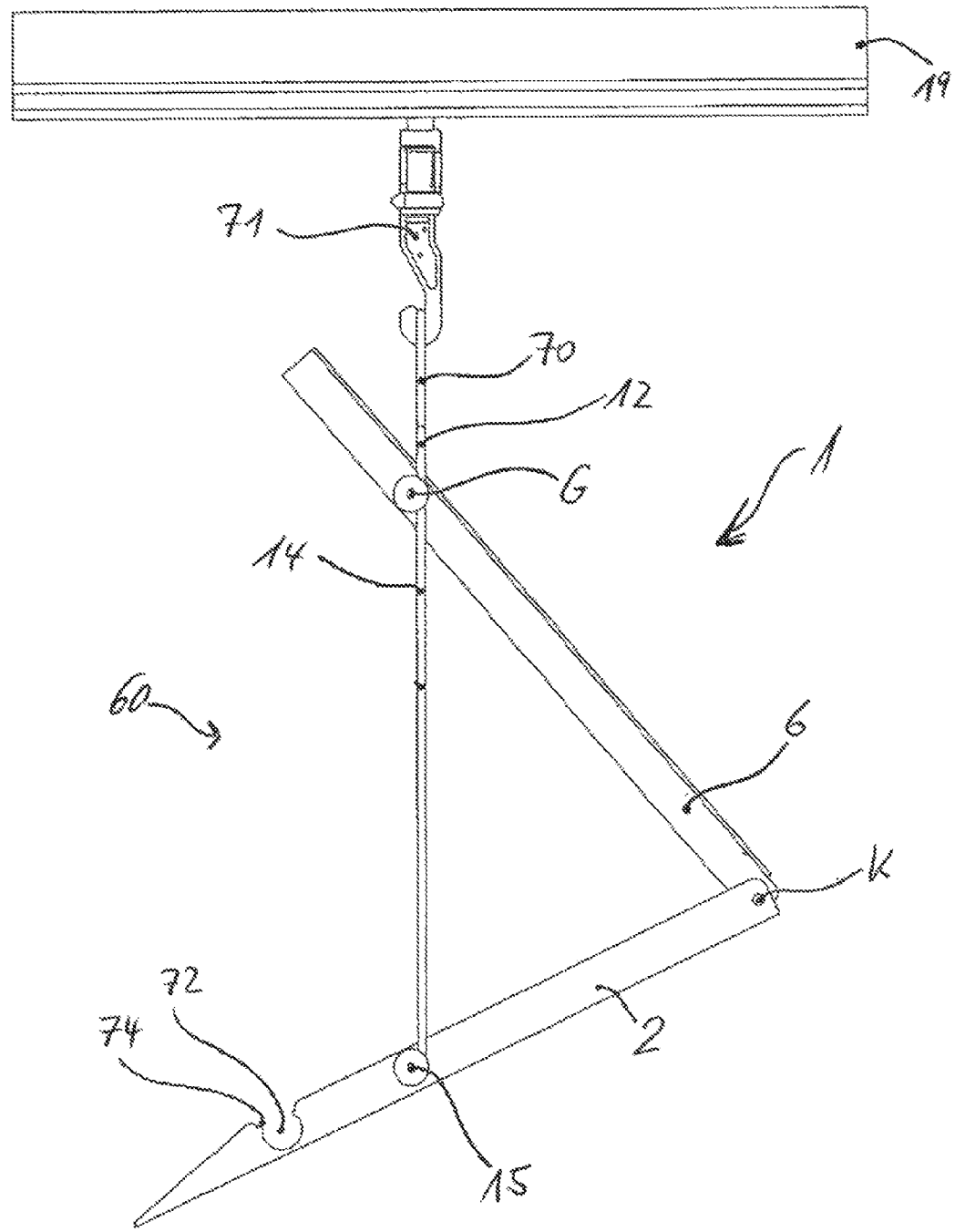
Figure 13:
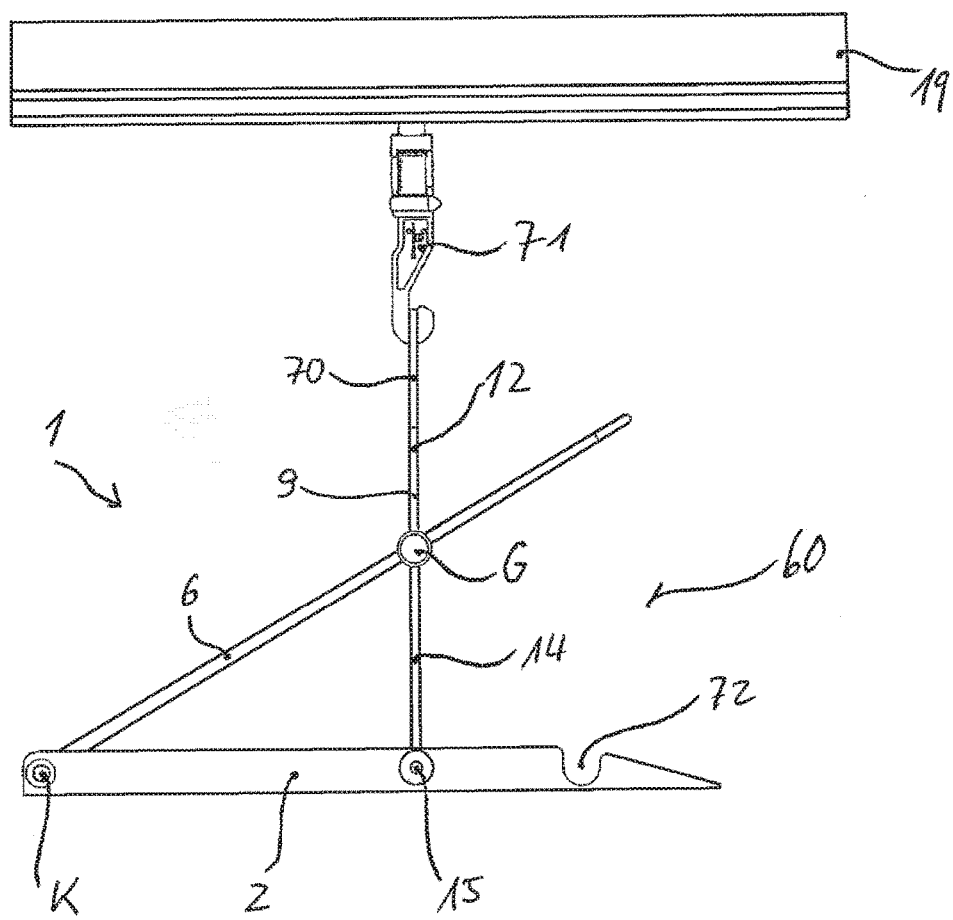
Figure 14:
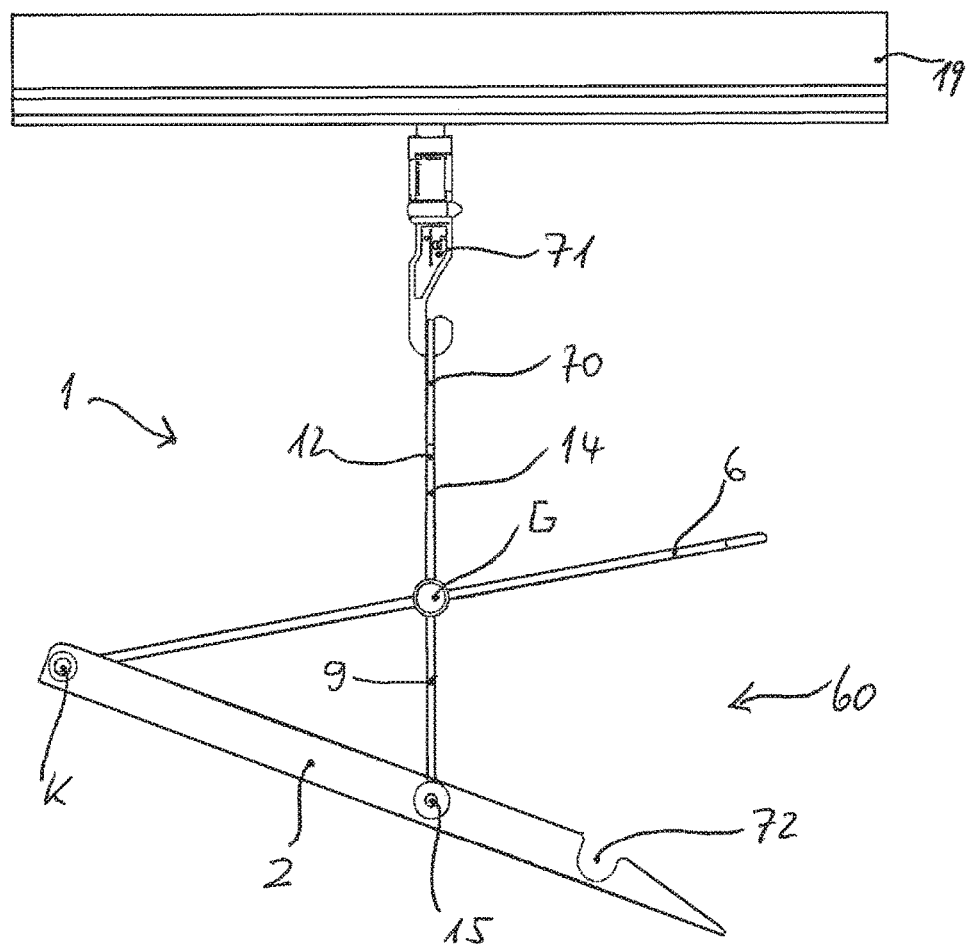
Figure 15:
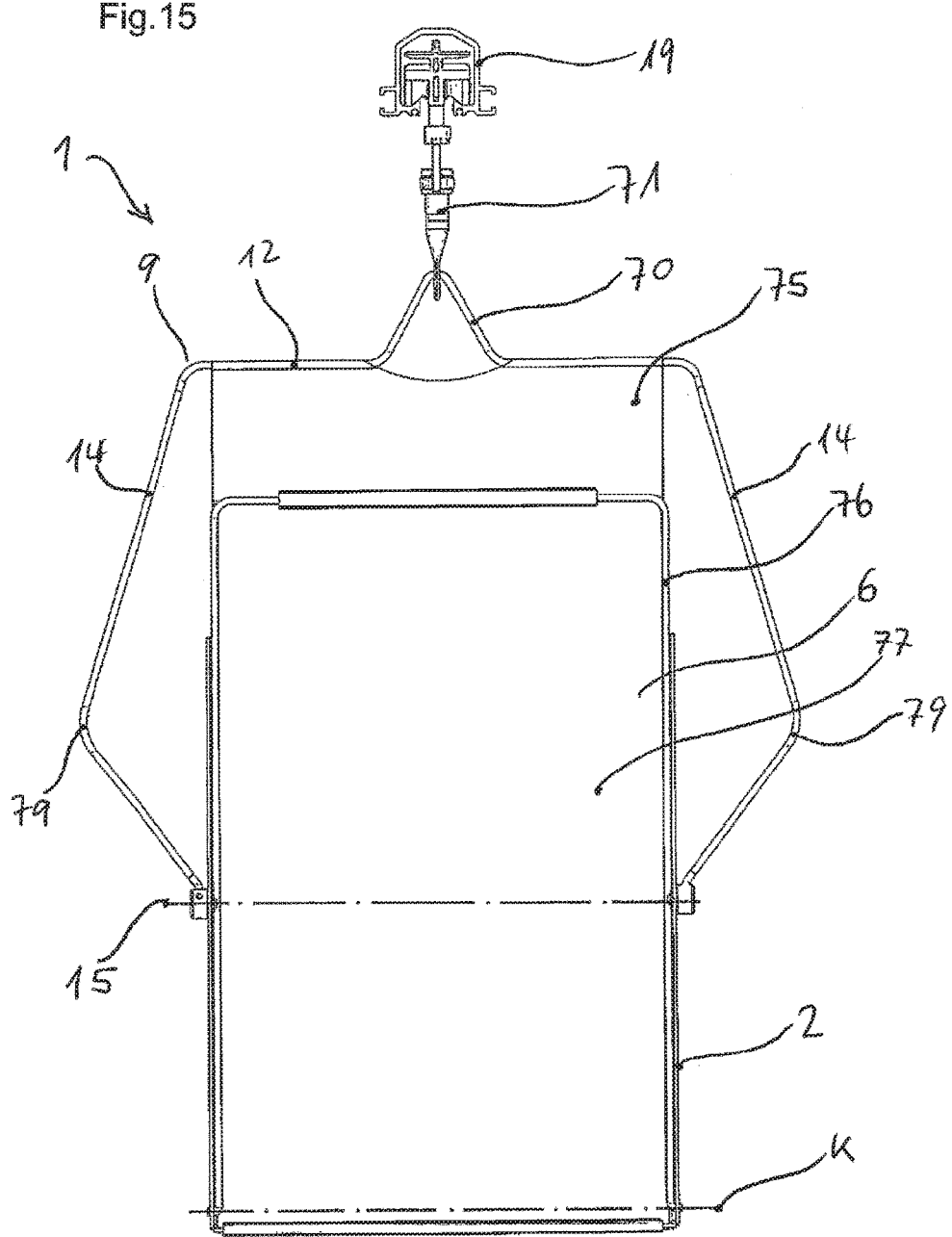
Figure 16:
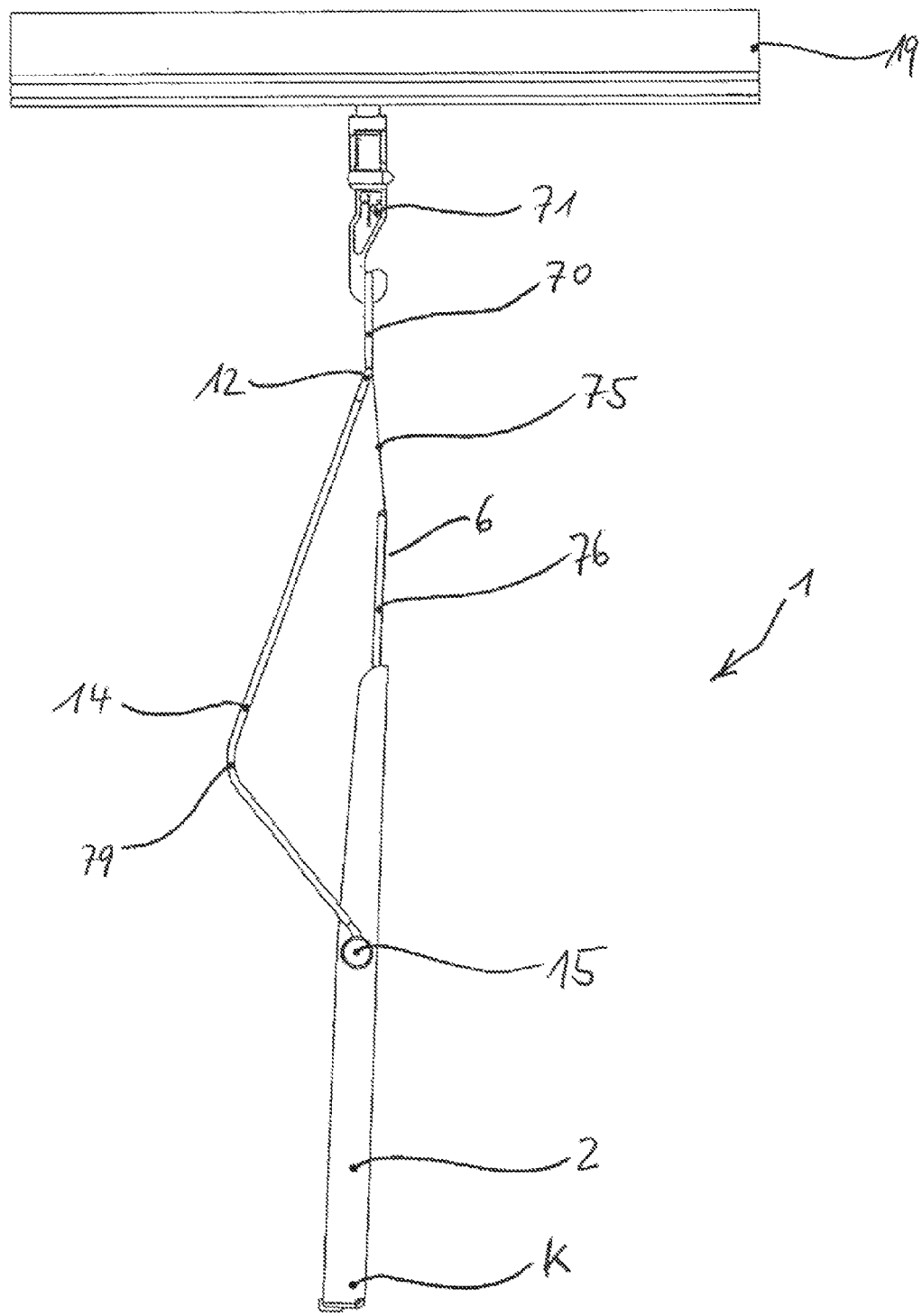
Figure 17:
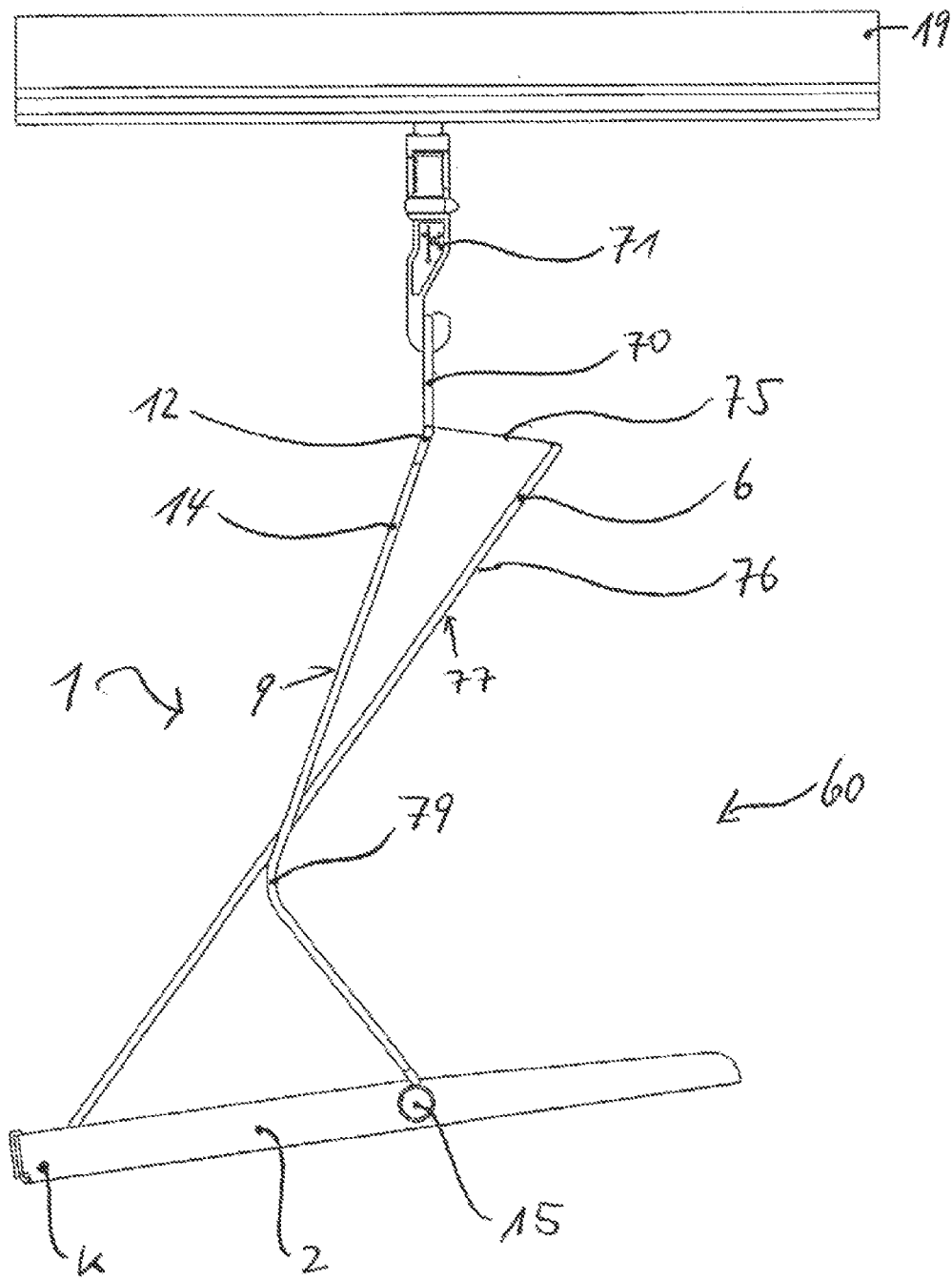
Figure 18:
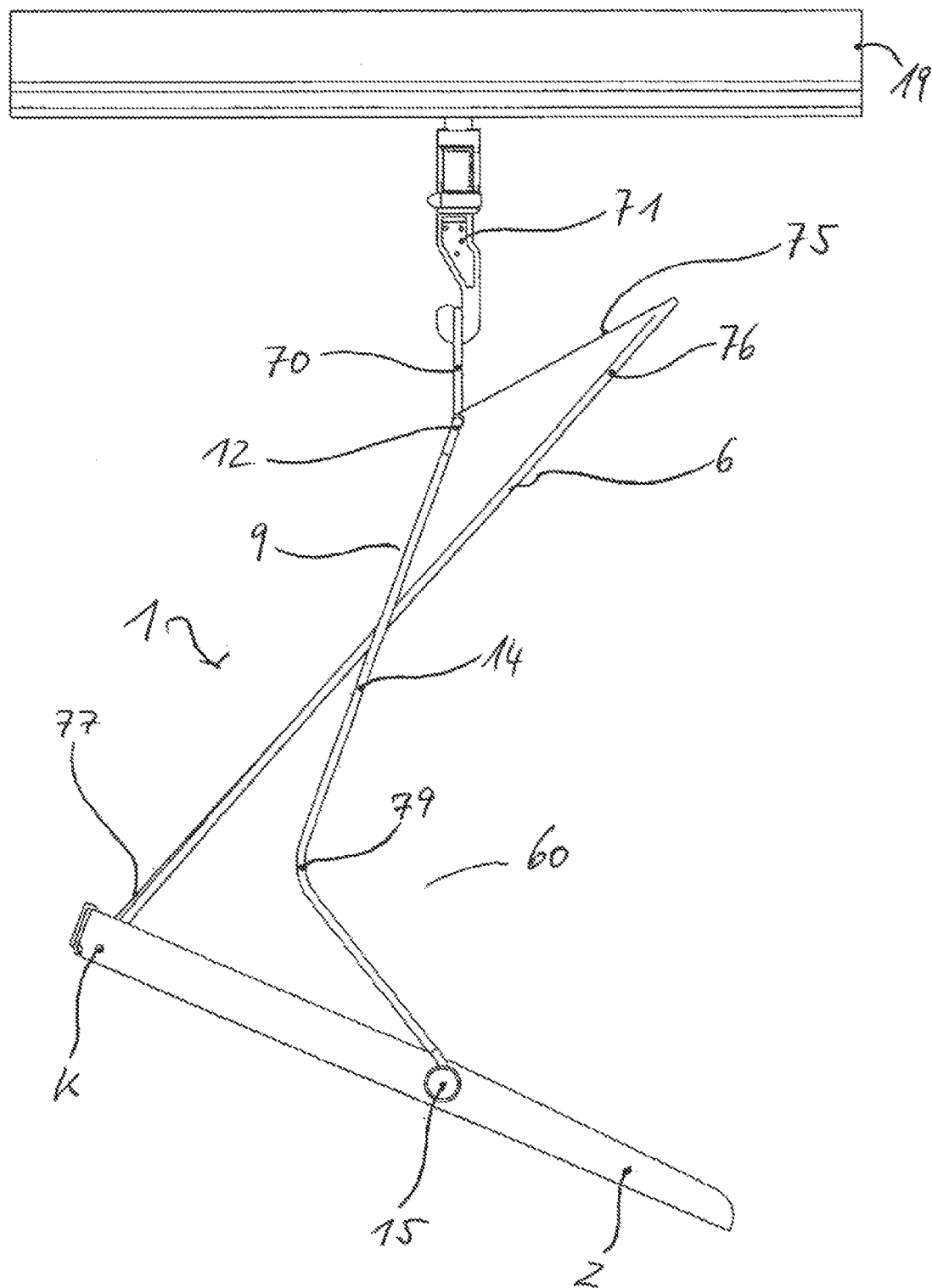
Figure 19:
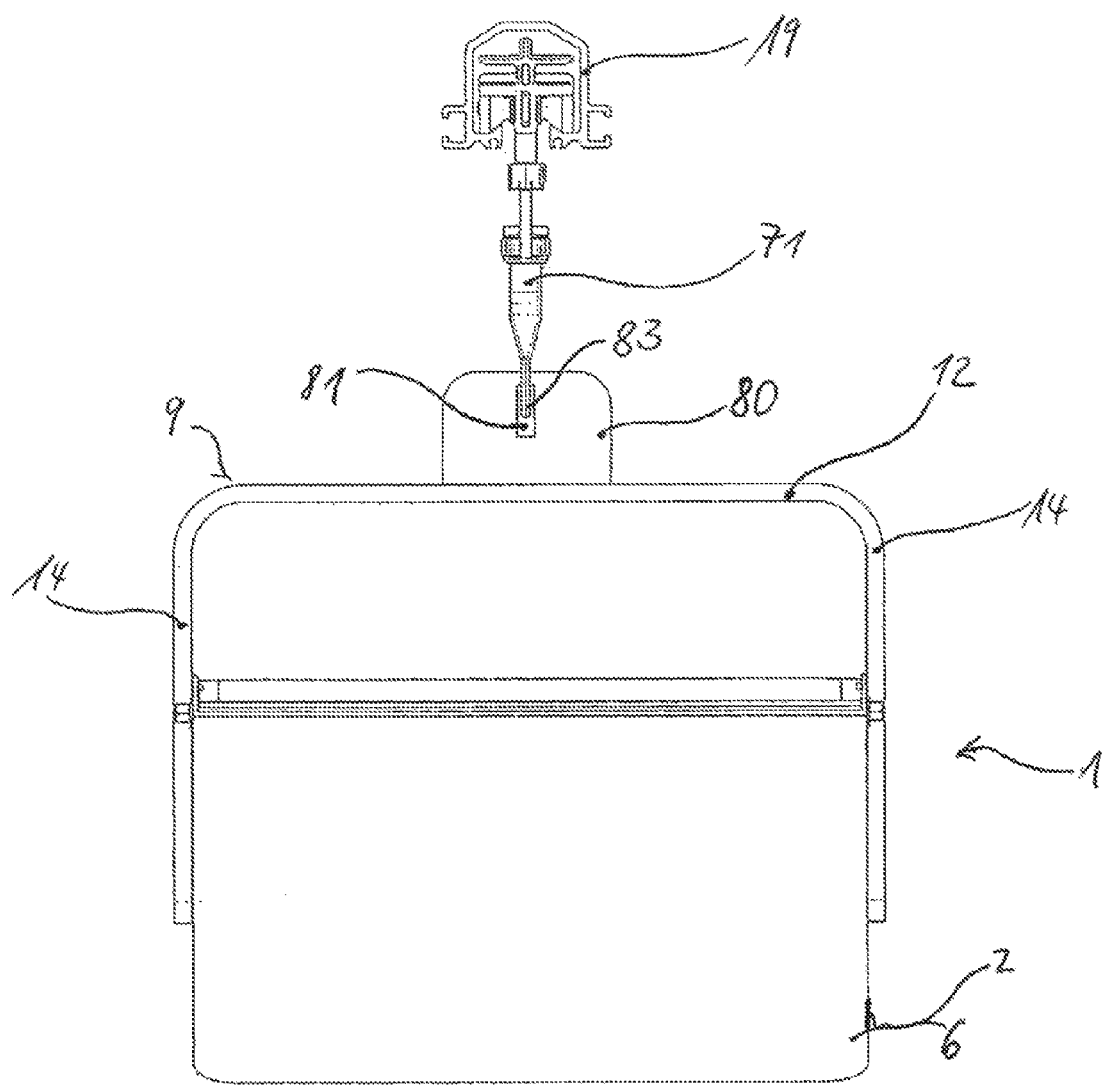
Figure 20:
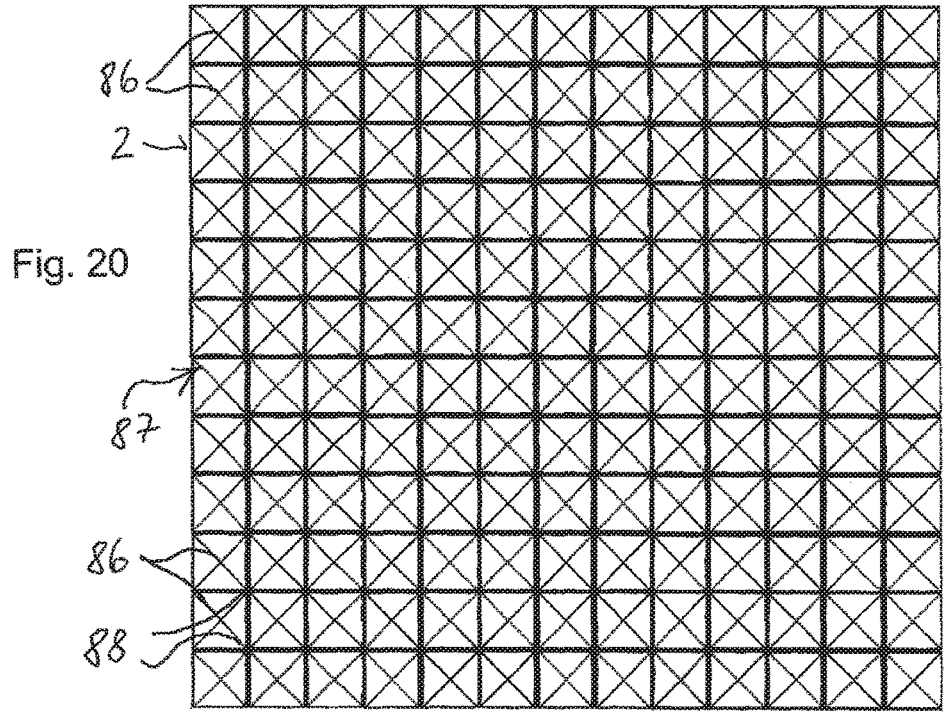
Figure 21:
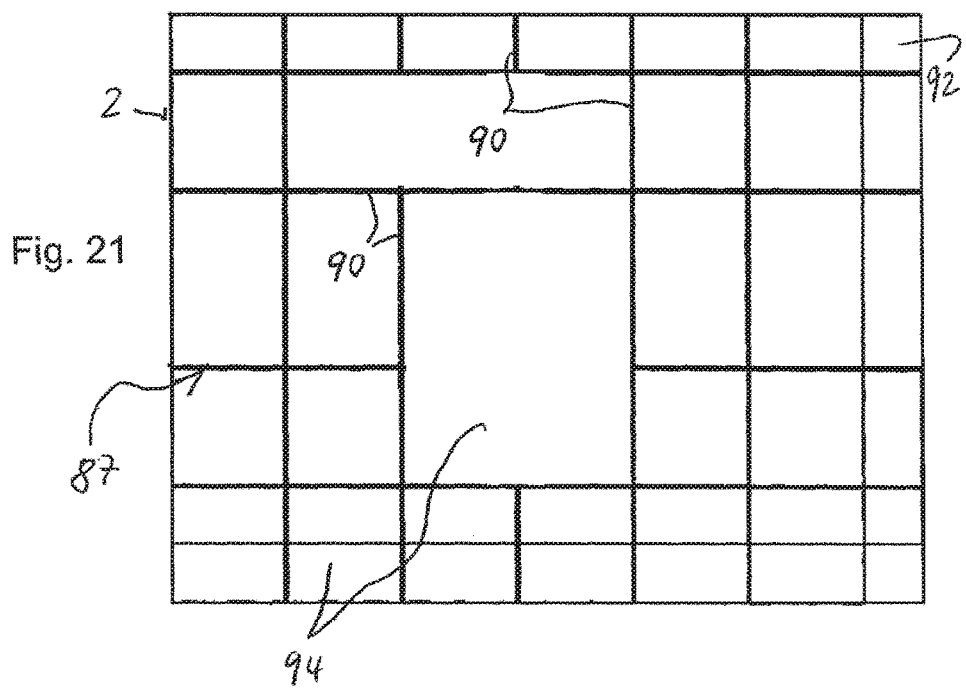

Embodiments of the present invention are described by way of example below with reference to the accompanying figures, in which FIG. 1 is a side view of an unloaded conveyed goods container in an open position, FIG. 2 is a top view of the unloaded conveyed goods container in its open position, FIG. 3 is a side view of the unloaded conveyed goods container in a transport position, FIG. 4 is a front view of the unloaded conveyed goods container in its transport position, FIG. 5 shows an operation of opening a conveyed goods container at a loading station, FIG. 6*a* shows a first embodiment of a position locking device in a cross section parallel to a main plane of a side wall element, FIG. 6*b* shows the embodiment shown in FIG. 6*a* of a position locking device in a cross section parallel to an edge portion of the side wall element which is arranged perpendicular to the main face of the side wall element, in an unlocked position, FIG. 6c shows the embodiment of the position locking device from FIGS. 6a and 6b in the same cross section as in FIG. 6b but in a locked position, FIG. 7a shows a further embodiment of a position locking device in a cross section in the plane of the side wall element in a locked state, FIG. 7b shows the embodiment of the position locking device from FIG. 7a in the same cross section in an unlocked position, FIG. 8a shows a further embodiment of a position locking device in a cross section parallel to the plane of the side wall element in the almost locked transport position of the conveyed goods container, FIG. 8b shows the position locking device from FIG. 8a in a cross section which is at a right angle to the cross section in FIG. 8a, likewise in the almost locked transport position, FIG. 8c shows the embodiment of the position locking device from FIGS. 8a and 8b in the same cross section as in FIG. 8b in an open position of the transport device, FIG. 9 is a front view of a further embodiment of the conveyed goods container according to the invention in its vertical closed position, FIG. 10 is a side view of the embodiment of the conveyed goods container according to FIG. 9 in its vertical closed position, FIG. 11 is a side view of the embodiment of the conveyed goods container according to FIGS. 9 and 10 in its horizontal loading position, FIG. 12 is a side view of the embodiment of the conveyed goods container according to FIG. 9-11 in its unloading position, FIG. 13 is a side view of a further embodiment of the conveyed goods container according to the invention in its horizontal loading position, FIG. 14 is a side view of the embodiment of the conveyed goods container according to FIG. 13 in its unloading position, FIG. 15 is a front view of an embodiment of the conveyed goods container according to FIG. 13-14 in its vertical closed position, FIG. 16 is a side view of the embodiment of the conveyed goods container according to FIG. 13-15 in its vertical closed position, FIG. 17 is a side view of the embodiment of the conveyed goods container according to FIG. 13-16 in its loading position, FIG. 18 is a side view of the embodiment of the conveyed goods container according to FIG. 13-17 in its unloading position, FIG. 19 is a front view of a further embodiment of the conveyed goods container in its vertical closed position, FIG. 20 is a top view of a conveyed goods position fixing element, and FIG. 21 is a top view of an alternative conveyed goods position fixing element.

FIG. 1 shows as an embodiment of the invention a conveyed goods container 1 in an open position in a side view. The arrow S indicates the direction in which gravity acts. The conveyed goods container 1 is a suspended bag for a suspended conveyor. In FIG. 1, the suspended bag, which is referred to hereinbelow as the conveyed goods container 1, is shown in a loading position in which it rests with a first bag side wall 2 on a support platform of a loading station 17 and is wide open, so that conveyed goods can comfortably be introduced into the conveyed goods receiving region 60 between the first bag side wall 2 and a second bag side wall 6. The bag side walls 2, 6, which face one another and delimit between them the conveyed goods receiving region 60, are connected together in a hinged connection region 62 in such a manner that they can be folded apart for opening and closing the conveyed goods receiving region 60 and form a jaw-like bag opening 64. The first bag side wall 2 has a preferably planar main surface portion 3 as a tray plane or base portion 3 and an edge contour portion 4 which projects beyond the main surface portion 3. The second bag side wall 6 is fastened in a foldable manner to the edge contour portion 4 at a fastening point 5 in the hinged connection region 62. The first bag side wall 2 is also referred to as the first side wall element 2 hereinbelow. The second bag side wall 6 is also referred to as the second side wall element 6 hereinbelow.

The suspended bag 1 further has as suspension means 9 a yoke, which has a middle portion 12 and two yoke limbs 14 protruding therefrom at bend points 13. At the ends of the two yoke limbs 14, the suspension means 9 is connected by means of a pivot device 8 to the first bag side wall 2 at opposite points of the edge contour portion 4 in such a manner that it is pivotably about a pivot axis 15, which lies in a plane parallel to the tray plane 3. In the transport position of the suspended bag 1 shown in FIGS. 3 and 4, the pivot axis 15 normally runs horizontally. The first bag side wall 2 can be pivoted about the pivot axis 15 out of the position shown in FIGS. 3 and 4 in order to reach a position according to FIGS. 1 and 2. The two bag side walls 2, 6 are thereby folded apart, because the second bag side wall 6 is connected at its end remote from the hinged connection region 62 to the middle portion 12 of the suspension means 9 and therefore does not follow the pivot movement of the first bag side wall 2 relative to the suspension means 9.

The pivot device 8 comprises at the opposite edge contour portions 4 of the first side wall element 2 a respective projection, which extends into an associated bearing hole in the suspension means 9, so that simply constructed swivel joints are thus produced between the suspension means 9 and the first bag side wall 2.

In the first example of the invention discussed here, a portion 6a of the second bag side wall 6 is foldable relative to the first bag side wall 2, as can clearly be seen in FIG. 1. On each side of the hinged connection region 62, the foldable portion 6a merges into a non-foldable portion 6b of the second bag side wall 6 and is there connected peripherally to the first bag side wall 2 with the edge contour portion 4 using a fixing means 7. In that manner, in the region of the suspended conveying bag 1 on the left in FIG. 1 and at the bottom in FIG. 3, a bag pocket 66 is formed which adjoins the jaw-like opening 64 and is closed on five outer sides. The edge contour portion 4 runs obliquely in the direction away from the bag pocket 66, which facilitates loading of the suspended bag 1.

The yoke-like suspension means 9 has an arm 11 with which it can be suspended, for example, from a movable conveying means of a suspended conveyor which is guided along a guide rail.

The first bag side wall 2 is a dimensionally stable side wall element and preferably consists of a rigid plastics material. In the loading position shown in FIG. 1, this side wall element 2 can be used as a loading tray, wherein conveyed goods can be placed onto the loading tray and, for example, moved further towards the bag pocket 66. The second bag side wall 6 is preferably formed from a dimensionally flexible material, so that it is deformable and can enclose conveyed goods in the conveyed goods receiving region 60 in a dimensionally flexible manner and can secure them against slipping in the suspended bag 1 as the second side wall element 6. The second bag side wall 6 can be formed from a textile cloth, for example. Preferably, however, it comprises a deformable plastics film which can mould itself in a dimensionally flexible manner to the conveyed goods in the conveyed goods receiving region 60 at least in regions. A conveying bag according to the invention can also have one or more tension belts or the like, in order to exert a position-fixing action on the received conveyed goods.

In FIG. 1, the second bag side wall 6 is shown tensioned in the open position and forms a slope relative to the base portion 3 of the first bag side wall 2, so that conveyed goods that are to be received from the right in FIG. 1 can be guided by the second bag side wall 6 towards the bag pocket 66. The open position shown in FIG. 1 also allows conveyed goods to be received whose height considerably exceeds the height of the edge contour portion 4. In the transport position, the second bag side wall 6 then curves in a position-fixing manner over the conveyed goods.

Although the second bag side wall 6 that acts as a position fixing element is shown in a tensioned state in FIG. 1, that does not necessarily have to be the case. However, during transfer of the conveyed goods container 1 into the transport position, the position fixing element 6 should have a tendency increasingly to move into a corresponding tensioned state. During loading and unloading, the opening jaw 64 of the suspended bag 1 is preferably opened in a relevant suspended conveyor in the transport direction T of the suspended bag.

FIG. 2 is a top view of the conveyed goods container 1 in its open position. The representation in FIG. 2 corresponds to a view from the direction corresponding in FIG. 1 to the direction of gravity S. The first side wall element 2, which is oriented transversely to gravity S, is accordingly to be seen with a view of its base portion 3. The base portion 3 is surrounded on three of its sides by the rigid edge contour portion 4. The second bag side wall 6 extends from the middle portion 12 of the suspension means 9 to fastening points 5 on the edge contour portion 4 of the first side wall element 2 and continues at the end of the first side wall element 2 that is remote from the suspension means 9 as far as the edge contour portion 4, which surrounds that end. The second side wall element 6 thereby covers the base portion 3 at the level of the upper edge of the edge contour portion 4. The second side wall element 6 forms between the fastening points 5 and the end of the first side wall element 2 that is remote from the suspension means 9 the upper side of the bag pocket 66, which is fastened to the edge contour portion 4 by the fixing means 7. The fixing means 7 thereby follows at least in part the course of the edge contour portion 4 in an end portion of the first side wall element 2 that is remote from the suspension means 9. As already mentioned, the suspension means 9 is in the form of a yoke and has the middle portion 12 and the limbs 14 protruding therefrom, which are pivotably connected to the first side wall element 2 by means of the joints 8. The second side wall element 6 is fastened to the suspension means 9 at the middle portion 12, which is shown schematically by the fastening point 10.

FIG. 3 is a side view of the conveyed goods container 1 in a transport position. The direction of gravity S runs from top to bottom in FIG. 3. In the transport position, with an unloaded conveyed goods container 1, the first side wall element 2 is oriented substantially parallel to the direction of gravity S. The suspension means 9 is oriented approximately parallel to the first side wall element 2 when the conveyed goods container 1 is unloaded. As a result of this relative position of the suspension means 9 to the first side wall element 2, the second side wall element 6 is tensioned, between the fastening point 10 and the fastening point 5, in the hinged connection region 62, parallel to and above the base portion 3 of the first side wall element 2, so that conveyed goods introduced between the second side wall element 6 and the base portion 3 are pressed against the base portion 3 with deformation of the second side wall element 6. Upon transfer into the transport position, the second side wall element 6 curves in a position-fixing manner over the conveyed goods that have been introduced. Preferably, the center of gravity 16 of the first side wall element 2 in conjunction with the second side wall element 6 is located in the transport position further in the direction of gravity S than the pivot device 8, so that gravity S causes the side of the first side wall element 2 that is remote from the suspension means 9 to hang down. In this manner, the closed position is stabilized by gravity S and a pressing force is effected on conveyed goods in the conveyed goods receiving region 60 between the second side wall element 6 and the first side wall element 2. The bag pocket 66 between the first side wall element 2 and the second side wall element 6 continued in the direction of the end of the first side wall element 2 that is remote from the suspension means 9 is closed by the edge contour portion 4 in the direction of gravity S and by the fixing means 7 in both transverse directions thereto, so that conveyed goods are not able to leave the conveyed goods receiving region 60 in the direction of gravity S and transversely thereto. The conveyed goods are thus held securely in the conveyed goods container 1.

FIG. 4 is a front view of the conveyed goods container 1 in its transport position. FIG. 4 shows how the second side wall element 6 extends from its fastening point 10 on the middle portion 12 of the suspension means 9 to the end of the first side wall element 2 that is remote from the suspension means 9, to which end it is fastened by the fixing means 7. In addition, the second side wall element 6 is connected at the fastening points 5 to the edge portion 4 of the first side wall element 2. The fastening points 5 define the hinged connection region, it being possible for their connecting line to represent a fold axis for the second side wall element 6 and the first side wall element 2 parallel to the pivot axis 15. The bag pocket 66 is formed in the direction of gravity S beneath the fastening point 5 between the second side wall element 6 and the first side wall element 2. The bag pocket is delimited in the direction of gravity S, which runs from top to bottom in FIG. 4, and transversely thereto by the edge contour portion 4. The fastening points 5 can be in such a form that they fix the second side wall element 6 only perpendicularly to the plane of projection, but at the same time permit stretching of the second side wall element also in the region of the bag pocket 66 and thus movement in the plane of projection also at the fastening points 5.

FIG. 5 shows the opening of a conveyed goods container 1 which is suspended in a transport rail 19 of a suspended conveyor. During the opening operation, the conveyed goods container 1 comes to rest at a loading station 17 in its open position. The first side wall element 2 is thereby pivoted relative to the suspension means 9, so that the conveyed goods receiving region 60 opens between the second side wall element 6, which extends with the suspension means 9 upwards, and the first side wall element 2, and the conveyed goods receiving region can be loaded counter to the transport direction T.

FIG. 5 shows five suspended bags as conveyed goods containers 1, which bags are conveyed along the transport rail 19 in the transport direction T. Three of the conveyed goods containers 1 are located in FIG. 5, by way of example, in a substantially planar portion 21 of the transport rail 19 in a waiting position for loading. For loading, a conveyed goods container 1 is brought in the example onto an incline 20 of the transport rail 19, on which the suspension point of the conveyed goods container 1 is accelerated. Because the center of mass M of the conveyed goods container 1 is located substantially beneath the suspension point in the conveyed goods container 1, a turning moment is produced which turns the conveyed goods container 1 in FIG. 5 clockwise, while the suspension point moves down the incline 20. Upon reaching the loading portion 22 of the transport rail 19, the conveyed goods container 1 is thus rotated in the plane of the drawing relative to the direction of gravity S. In a departure from the representation of FIG. 5, the loading station 17 can in practice be arranged in the transport direction in such a manner that the already tilted conveyed goods container 1 encounters the slope 18 of the loading station 17 at the end of the incline. Preferably, the conveyed goods container 1, as a result of its momentum from the incline 20, is pulled from the chamfer 18 onto a plateau 24 which is preferably located on top of the loading station 17. The conveyed goods receiving region 60 thereby opens as a result of the first side wall element 2 being pivoted from its inclined orientation relative to gravity S into a position substantially perpendicular to gravity S. After loading of the conveyed goods receiving region, the conveyed goods container 1 can be pulled from the plateau 24 in the transport direction until the first side wall element 2 leaves the plateau. The center of mass 16 of the second side wall element 6, of the transported goods and of the first side wall element 2 then has the effect that the end of the first side wall element 2 that is directed against the transport direction in the open position pivots downwards and brings the conveyed goods container 1 into its transport position. In addition, external forces can optionally be exerted on the conveyed goods container 1 in order to close it manually or optionally automatically. By being transferred to a second incline 23, the conveyed goods container 1 can be conveyed further in the transport direction T by gravity.

It should be noted at this point that FIG. 5 shows only an arbitrary example of a routing arrangement of a suspended conveyor with suspended bags according to the invention, and that numerous other advantageous possibilities can be used in respect of the architecture of the conveyor path. Loading zones, unloading zones or/and combined loading/unloading zones of different sizes can thereby be provided.

It should further be pointed out that the suspended bags 1 in the relevant embodiments of the suspended conveyor can be suspended from a guide rail in such a manner that they are rotatable about an axis that runs transversely to the pivot axis 15, in particular vertically. There is thus the possibility of also orienting the opening jaw 64 laterally to the transport direction or optionally at an angle thereto, so that the loading operation or/and unloading operation can optionally be facilitated in that manner.

Of course, it is also possible, if required, for a plurality of conveyed objects to be loaded in a suspended bag and transported in a protected manner. It is also possible to provide suspended bags of different sizes according to the invention in a suspended conveyor.

At least in some embodiments of a suspended bag according to the invention, particularly long conveyed objects can also be transported in such a manner that they project over the upper edge of the bag side walls in the transport position.

FIG. 6a shows an embodiment of a position locking device 30 with which the side wall element 2 can be locked relative to the suspension means 9, that is to say in relation to a pivoting movement. The position locking device 30 comprises an axle element 31 which is fastened, preferably screwed, to the edge portion 4 of the first side wall element 2, an end portion 32 of the suspension means 9, and a fixing plate 33 which is screwed to the axle element 31. The end portion 32 of the suspension means 9 is in the form of an eye, inside which an axle portion 34 of the axle element 31 is pivotably arranged. The axle element 31 preferably has threaded bores into which screws are fitted for fastening to the edge portion 4 and for fastening the fixing plate 33.

FIG. 6b shows the embodiment of the position locking device 30 in FIG. 6a in an unlocked position, in a cross section that is arranged perpendicularly to the cross section in FIG. 6a. In FIG. 6b, the end portion 32 of the suspension means 9 can clearly be seen in the form of an eye which encloses the axle portion 34 of the axle element 31. The eye of the end portion 32 has on its inner periphery an abutment portion 35 with an annular cross section. An abutment portion 36 on the periphery of the axle portion 34 also has an annular cross section. In an unlocked position of the position locking device 30, the abutment portions 35 and 36 abut one another. They preferably have substantially the same radius of the annular cross section. A projection 37 is provided on a peripheral portion of the axle portion 34 that is remote from the annular abutment portion 36 of the axle portion 34. The inner periphery of the eye of the end portion 32 of the suspension means 9 has a cut-out 38. The projection 37 is suitable for engaging into the cut-out 38 and thereby preventing substantial pivoting of the suspension means 9 relative to the side wall element 2. In the unlocked position shown in FIG. 6b, however, the projection 37 does not engage into the cut-out 38. The eye in the end portion 32 is slightly elongated in the longitudinal direction of the suspension means 9, so that the axle portion 34 is displaceable inside the eye. In this manner, engagement or disengagement of the projection 37 with the cut-out 38 can be effected. To that end, the suspension means 9 is displaceable in the direction of its longitudinal axis relative to the side wall element 2, the axle portion 34 moving in the eye of the end portion 32.

FIG. 6c shows the embodiment of the position locking device 30 shown in FIGS. 6a and 6b in a locked position, in the same cross section as FIG. 6b. The projection 37 has entered the cut-out 38, so that the two overlap. A pivoting movement between the suspension means 9 and the first side wall element 2 is thereby prevented. In comparison with FIG. 6b, the suspension means 9 in FIG. 6c is displaced in its longitudinal direction in relation to the side wall element 2. As a result, the abutment portions 35 and 36 are no longer in contact, while the projection 37 and the cut-out 38 are in engagement. This is possible owing to the orientations of the projection 37 and of the cut-out 38 in the transport position. In alternative embodiments, the orientations can also be so arranged that this is also possible, alternatively or additionally, for one or more open positions. The eye of the end portion 32 in this case permits a corresponding movability of the axle portion 34 inside the eye.

FIG. 7a shows a further embodiment of a position locking device 40 in a cross section parallel to a main plane of the first side wall element 2 in a locked position. The position locking device 40 comprises an axle element 41 which is fastened, preferably screwed, to the edge portion 4 of the first side wall element 2. The axle element 41 is surrounded by an end portion 42 of the suspension means 9 which is provided with an eye 42, the axle element 41 being located inside the eye. The suspension means 9 is pivotably about the axle element 41. On the end of the axle element 41 that is remote from the edge portion 4 there is fitted a cap-like button 43, the button 43 being fastened in such a manner that it is not rotatable but is displace able relative to the axle element 41. An inner periphery of the button 43 has an inner peripheral surface which is complementary to the outer periphery of the axle element 41. The outer peripheral surface of the axle element 41 and the inner peripheral surface of the button 43 are so formed that the button 43 and the axle element 41 are not rotatable relative to one another when they are fitted together. To that end, grooves and corresponding springs are preferably arranged in each case in one of the outer peripheral surface of the axle element 41 and the inner peripheral surface of the button 43, in each case in a longitudinal direction in which the two parts can be fitted together. The axle element 41 is screwed to the edge portion 4 in a rotationally secure manner, so that the button 43 fitted onto the axle element 41 is likewise rotationally secure with respect to the edge portion 4 and accordingly to the side wall element 2. The button 43 is biased in a direction away from the edge portion 4 by a spring element 44, which can be in the form of a helical spring or the like. The button 43 has a shoulder 46 on its outer periphery. The shoulder 46 prevents the spring element 44 from being relaxed completely. To that end, the shoulder 46 abuts a fixing ring 45, which is fastened, preferably screwed, in a rotationally secure manner to the end portion 42 of the suspension means 9. The abutment surface between the shoulder 46 and the fixing ring 45 is mutually complementary and mutually rotationally secure in the case of engagement. In particular, the shoulder 46 can be crown-shaped or can taper off almost like a splined shaft. The fixing ring 45 is provided with cut-outs which are able to receive the end of the splined shaft, or the prongs of the crown, and thus effect locking relative to a pivoting movement. It is pointed out that in FIG. 7a, the shoulder 46 is arranged beneath the central axis 47 of the position locking device 40 further towards the edge portion 4 than the shoulder 46 arranged above the center line 47, which represents a crown prong or a projecting portion of the splined shaft end of the button 43. The abutment surface for the shoulder 46 in the fixing ring 45 is suitably formed for receiving the prong or the splined shaft end. Preferably, the end of the button 43 that is remote from the edge portion 4 is, when not pressed in, the part of the position locking device 40 that is located furthest from the edge portion 4.

FIG. 7b shows the position locking device 40 from FIG. 7a in the same cross section but reflected and in an unlocked position. The screws for fastening the fixing ring 45 have been omitted. The button 43 is pressed in towards the edge portion 4, so that the spring element 44 is tensioned. The projecting portions of the crown-shaped or splined-shaft-shaped end on the shoulder 46 of the button 43 are thereby out of engagement with their associated abutment surface on the fixing ring 45. The locking action between the suspension means 9 and the side wall element 2 is thus lifted, so that the suspension means 9 is freely pivotably relative to the first side wall element 2. The spring element 44 has the effect that the button 43 has a locking action in the unoperated state.

FIG. 8a shows a further embodiment of a position locking device 50 in a cross section parallel to the main plane of the side wall element 2, in a locked position. The position locking device 50 comprises an axle element 51 which is fastened, preferably screwed, in a rotationally secure manner to the edge portion 4 of the side wall element 2. The axle element 51 is pivotably arranged in an eye of an end portion 52 of the suspension means 9. For the purpose of fixing the axle element 51 in the eye of the end portion 52, a fixing plate 53 is fastened to the axle element 51. The fixing plate effects an interlocking engagement, which prevents the end portion 52, which is arranged around the eye thereof, from becoming removed from the axle element 51. The outer periphery of the axle element 51 has a preferably dome-shaped cut-out 54. In the position of the position locking device 50 shown in FIG. 8a, a ball 55 engages into the cut-out 54. The ball 55 is biased against the cut-out 54 by a spring element 56, which is preferably in the form of a helical spring. The spring element 56 is located inside the suspension means 9. The spring element 56 abuts the suspension means 9 in order to effect the biasing of the ball 55. The suspension means 9 can be open on its side facing the side wall element 2, at the point at which the spring element 56 is arranged. In this manner, the spring element 56 and the ball 55 are accessible from one side of the suspension means 9, which can facilitate the mounting and/or maintenance thereof.

FIG. 8b shows the same embodiment of the position locking device 50 as FIG. 8a in a cross section which is at a right angle to the cross section shown in FIG. 8a. The position locking device 50 is shown in a state in which the operation of engaging the ball 55 into the cut-out 54 is almost complete. In the completed locking state, the ball 55 abuts the inner surface of the cut-out 54 and/or the edge thereof. The inner periphery of the end portion 52 of the suspension means 9 is preferably in annular form. Compared with an annular cross section, the outer periphery of the axle element 51, which is located inside the eye of the end portion 52, preferably has, in addition to the cut-out 54, a recess 57 which runs along the periphery and the depth of which increases in the peripheral direction as it becomes further away from the cut-out 54. In an alternative embodiment, the recess 57 can be omitted. The relative position shown in FIG. 8b of the axle element 51 and the suspension means 9 corresponds to the transport position of the conveyed goods container 1. When the ball 55 is engaged in the cut-out 54, the conveyed goods container 1 is thus locked in the transport position.

FIG. 8c shows, in the same cross-sectional view as FIG. 8b, the same embodiment of the position locking device 50 in an open position of the conveyed goods container 1. In contrast to the almost locked position of the position locking device 50 shown in FIG. 8b, the ball 55 is located in the recess 57 in the open position of the conveyed goods container 1. In order to move from the locked position, in which the ball 55 is arranged in the recess 57, to the open position, the ball 55 must surmount a region 58 at the periphery of the axle element 51 in order to pass from the cut-out to the recess. The spring element 56 is thereby compressed, so that a force must be applied in order to leave the locked position. If the ball has surmounted the region 58, it reaches the recess 57, which has an increasingly smaller radius as the position of the ball inside it changes as the suspension means 9 is pivoted further in relation to the first side wall element 2. The spring element 56 thereby relaxes and releases energy, which assists the movement of the conveyed goods container 1 into its open position. The decrease in radius of the recess 57 ends at the end of the recess 57 that is remote from the cut-out 54. Accordingly, the conveyed goods container 1 does not receive any further impetus to move from the position locking device 50 when the ball 55 reaches that position. In addition, the ball 55 finally comes up against the end of the recess 57 that is remote from the cut-out 54. In order to surmount that end, the ball 55 would have to be pressed out of the recess 57 against the bias of the spring element 56. This means that the position of the position locking device 50 in which the ball is located at the end remote from the cut-out 54 forms an energy deficit with maximum relaxation of the spring element 56 and thus a stable relative position between the suspension means 9 and the first side wall element 2. In comparison with the locked position which is to be left, in which the ball 55 is located in the cut-out 54, the force required for transfer into the transport position, or locked position, is considerably lower. Accordingly, upon closing, easy operation of the conveyed goods container 1 is possible in the direction of the transport position, in which the conveyed goods container 1 is held securely on account of the locking action. It is not necessary to carry out separate actuation of the position locking device 50 in order to release the locking. It is sufficient to apply a sufficiently great force to the suspension means 9 and the side wall element 2.

FIG. 9 is a schematic front view of a further embodiment of a conveyed goods container 1 in a vertical closed position. The conveyed goods container 1 consists substantially of a hinged holding frame 9 as the suspension means and a first and a second side wall element 2, 6, which are located behind one another in the plane of projection. The first and the second side wall element 2, 6 are rotatably connected to one another via a fold axis K. The hinged holding frame 9, which is preferably yoke-shaped, encloses the two side wall elements 2, 6 with its limbs 14. The hinged holding frame 9 is preferably bent from a tube or a rod, preferably a metallic round tube or round rod. Alternatively, plastics material, for example, can be used. The first side wall element 2 is rotatably connected to the hinged holding frame 9 via a pivot axis 15. The hinged holding frame 9 is connected to the second side wall element 6 via an articulated joint arrangement G, which is in the form of two individual joints on both sides of the second side wall element 6. In this embodiment, the articulated joint arrangement G is connected rotatably to the second side wall element 6 and displaceably to the hinged holding frame 9. The limbs 14 of the hinged holding frame 9 are connected to a frame middle region 12 of the hinged holding frame 9. The limbs 14 are preferably straight and parallel to one another. Preferably, they form a component of a guide for the articulated joint arrangement G which in each case encloses the limbs 14 of the hinged holding frame 9 so that it can glide along the limbs. The hinged holding frame 9 has at its upper end a bent receiving nose 70, which projects upwards. A hook of a conveying means 71 of a suspended conveyor engages into the receiving nose 70, which conveying means 71 is displaceably arranged in a guide rail 19.

FIG. 10 is a schematic side view of the conveyed goods container 1 in a vertical closed position. In this position, the second side wall element 6 is preferably located in the first side wall element 2 and is preferably at least approximately parallel thereto. The first side wall element 2 is substantially sheet-like with bent edge regions 4, one of which can be seen in FIG. 10 extending substantially vertically in the plane of projection. The second side wall element 6 is located inside the first side wall element 2 behind the bent edge region 4. At the point of the bent edge region of the first side wall element 2 that is identified by the reference numeral 15, the edge region 4 is pivotably connected to one end of a limb 14 of the hinged holding frame 9, so that 15 indicates the position of the pivot axis. An identical configuration is provided on the side of the conveyed goods container 1 that is remote from the plane of projection, so that the two rotatable connection points together represent the pivot axis 15. The limb 14 extends from the pivot axis 15 in a displaceable manner through the articulated joint arrangement G. The articulated joint arrangement G is connected to the internal second side wall element 6 and is preferably located in a cut-out in the bent edge region of the first side wall element 2. In this manner, the limb 14 of the hinged holding frame 9 can be arranged outside the first side wall element 2.

FIG. 11 is a schematic side view of the embodiment of the conveyed goods container 1 from FIG. 9-10 in a loading position in which the first side wall element 2 is in an at least approximately horizontal position. The fold axis K and the pivot axis 15 are located at the same height. The second side wall element 6 is at an opening angle relative to the first side wall element 2, as a result of which a conveyed goods receiving region 60 is formed between the two side wall elements 2, 6. The limb 14 of the hinged holding frame 9 is in this position preferably at least approximately perpendicular to the first side wall element 2. The articulated joint arrangement G slides from the closed position along a portion of the limb 14 towards the receiving nose 70. In comparison with the closed position, in which the limb 14 of the hinged holding frame 9 and the second side wall element 6 are arranged in parallel, those two elements are at an angle to one another in the loading position shown in FIG. 11. This rotary movement is compensated by the articulated joint arrangement G. The common center of gravity of the second side wall element 6 and of the first side wall element 2 lies in this position between the fold axis K and the pivot axis 15. In order to obtain the position shown, a force is therefore required, for example, which supports the first side wall element 2 between the fold axis K and the pivot axis 15 from beneath. If such a force is removed, the conveyed goods container 1 falls back into the closed position shown in FIG. 10. The articulated joint arrangement G thereby returns to a cut-out 72 in the bent edge region 4 of the first side wall element 2, where it preferably engages with a holding nose 74. A locking release force is then required to open the conveyed goods container 1 from its closed position again.

In FIG. 12, the conveyed goods container 1 is shown in a schematic side view in an unloading position. The first side wall element 2 is inclined relative to the horizontal, so that conveyed goods which are located on the first side wall element 2 are able to slide down it. The fold axis K is thereby located in a higher position than the pivot axis 15. In comparison with the loading position shown in FIG. 11, the conveyed goods receiving region 60 is even more accessible, because the opening angle between the second side wall element 6 and the first side wall element 2 is enlarged further. The articulated joint arrangement G is located in an even higher position on the limb 14 of the hinged holding frame 9. In a variant, the upper side of the second side wall element 6 abuts the frame middle region of the hinged holding frame 9 which connects the two limbs 14. In this manner, the frame middle region of the hinged holding frame 9 forms a stop for the opening of the conveyed goods container 1. As in the loading position, a force acting from beneath, for example, between the fold axis K and the pivot axis 15 is also required in the unloading position on account of the position of the center of gravity of the two side wall elements 2, 6, in order to hold the conveyed goods container 1 in the unloading position. If this force is removed, the conveyed goods container 1 falls back into the closed position via the loading position.

FIG. 13 is a schematic side view of a further embodiment of the conveyed goods container 1 in a loading position. Elements which are the same as in the embodiments described above are denoted by the same reference numerals and will not be described separately again. FIG. 13 corresponds substantially to FIG. 11, and the differences between these two figures will be discussed below. In FIG. 11, the articulated joint arrangement G is fixed to the second side wall element 6 and is able to slide along the limb 14 of the hinged holding frame 9. In the embodiment shown in FIG. 13, on the other hand, the articulated joint arrangement G is fastened to the limb 14 of the hinged holding frame 9 and is able to slide along the second side wall element 6. At the same time, the articulated joint arrangement G is able to compensate for angle changes between the limb 14 of the hinged holding frame 9 and the second side wall element 6. In one embodiment, a groove can be formed in the edge of the second side wall element 6 that lies in the plane of projection, in which groove a portion of the articulated joint arrangement G is able to slide, so that a guide is thus produced. The portion of the articulated joint arrangement G is preferably in the form of a rod having a round cross section. In an alternative embodiment, an element of the articulated joint arrangement G can enclose the edge of the second side wall element 6 and thus form a guide. Upon transfer into a closed position, which corresponds substantially to the position shown in FIG. 10, the articulated joint arrangement G slides along the edge of the second side wall element 6 towards its end remote from the fold axis K, while at the same time the first side wall element 2 moves closer to the vertical. When the closed position is reached, the articulated joint arrangement G engages into the cut-out 72 in the bent edge of the first side wall element 2. The cut-out 72 is at the same distance from the pivot axis 15 as the articulated joint arrangement G is from the pivot axis 15.

FIG. 14 is a schematic side view of the embodiment of the conveyed goods container 1 from FIG. 13 in an unloading position. The first side wall element 2 is tilted relative to the horizontal, so that conveyed goods located thereon are able to slide off it. The fold axis K is higher than the pivot axis 15. The articulated joint arrangement G is located in a position on the second side wall element 6 which is further towards the fold axis K as compared with its position in the loading position shown in FIG. 13. The distance between the articulated joint arrangement G and the pivot axis 15 is unchanged.

FIG. 15 is a schematic front view of a further embodiment of the conveyed goods container 1 in a closed position. Elements which are the same as those in the embodiments described above are denoted by the same reference numerals. Only differences therefrom will be described separately hereinbelow. In the closed position shown, the second side wall element 6, the first side wall element 2 and the hinged holding frame 9 are arranged substantially in the vertical direction. The second side wall element 6 comprises a frame 76. The frame 76 is preferably provided with a lining 77 on the inside. The lining 77 of the second side wall element 6 is preferably connected to an end portion of the first side wall element 2 on which the fold axis K is arranged. Conveyed goods therefore cannot fall out of the conveyed goods container 1 at the bottom in the closed position. Particularly preferably, the lining 77 is continued as a connecting portion between the upper edge of the frame 76 and the frame middle region 12 of the hinged holding frame 9. The lining 77 continued as a connecting portion is connected to the frame middle region 12 of the hinged holding frame 9. The region of the suspension nose 70 is excluded from the fastening of the connecting portion. Preferably, the connecting portion is not connected to the upper edge of the frame 76 but is simply placed thereon. The first side wall element 2 is in the form of a tray, in which lateral edge regions are bent over at the sides facing the limbs 14 of the hinged holding frame 9. The fold axis K is preferably formed in those lateral edge regions, the two ends of the frame being angled towards the outside of the conveyed goods container 1 and being inserted through holes in the edge regions of the first side wall element 2. Preferably, an edge region, shown at the bottom in FIG. 15, of the first side wall element 2 is also in bent form and adjoins the lateral bent edge regions. The hinged holding frame 9 is formed with kinked limbs 14. In one embodiment, these project from the lateral edge regions towards the outside of the conveyed goods container 1. A kinked point 79 in the limbs 14 is at the greatest distance from the lateral edge regions. The pivot axis 15 is preferably arranged at the ends of the limbs 14. The terminal elements prevent the hinged holding frame 9 from rubbing against the edge region of the first side wall element 2. In a further embodiment, the end of the limbs 14 is angled towards the inside of the conveyed goods container 1 and in each case inserted through an opening in one of the lateral bent edge regions of the first side wall element 2 in order to form the pivot axis 15.

FIG. 16 is a schematic side view of the conveyed goods container 1 from FIG. 15 in a closed position. The figure corresponds to FIG. 10 in some details. The differences with respect to that figure will be discussed hereinbelow. In contrast to the embodiment of the conveyed goods container 1 according to FIG. 10, the embodiment in FIG. 16 does not have an articulated joint arrangement G. Its function is replaced by the connecting portion 75. The connecting portion 75 connects the upper end of the frame 76 of the second side wall element 6 to the frame middle region 12 of the hinged holding frame 9, it being possible for the mentioned portions of the connected elements to rotate and move relative to one another owing to the movability of the connecting portion 75.

FIG. 17 is a schematic representation of the embodiment of the conveyed goods container 1 from FIG. 16 in a loading position. The first side wall element 2 is located in an approximately horizontal position, so that conveyed goods can be deposited on the first side wall element 2. Alternatively, the first side wall element 2 in the loading position can have a steeper angle, at which the fold axis K is in an even lower position relative to the pivot axis 15, so that conveyed goods deposited on the first side wall element 2 slide towards the fold axis K into the rear/bottom portion of the conveyed goods receiving region 60. Opening of the conveyed goods container 1 and the associated raising of the fold axis K is also accompanied by a change in position of the upper edge of the frame 76. In a loading variant of the conveyed goods container 1 shown in FIG. 17, the frame 76 of the second side wall element 6 crosses the hinged holding frame 9. The upper end of the frame 76 is then oriented further towards the open end of the first side wall element 2 than the frame middle region 12 of the hinged holding frame 9. A lining 77 of the frame 76 and the connecting portion 75 are held in position by the upper edge of the frame 76. In a further loading variant (not shown), the frame 76 of the second side wall element 6 does not cross the hinged holding frame 9. The upper end of the frame 76 is oriented further towards the fold axis K than the frame middle region 12 of the hinged holding frame 9. The lining 77 of the frame 76 and the connecting portion 75 are not tensioned by the frame 76. The frame 76 then lies on the lining 77 lightly or not at all. The kink 79 in the limbs 14 of the hinged holding frame 9 effects better accessibility of the conveyed goods receiving region 60. The common center of gravity of the first and the second side wall elements 2, 6 is located on the side of the fold axis K in relation to the pivot axis 15, so that the conveyed goods container 1 returns to the closed position without forces that hold it in the loading position.

FIG. 18 is a schematic representation of the conveyed goods container 1 from FIG. 17 in an unloading position. Owing to the fact that the frame 76 of the second side wall element 6 is connected to the fold axis K, the upper end of the frame 76 is also pushed further upwards in comparison with the open position. This results in stretching of the connecting portion 75 and the lining 77 connected thereto, which is preferably correspondingly resilient. The associated tensioning of the lining 77 has the effect that the conveyed goods container 1 tends to return to a position in the direction of the closed position. The position into which the tension in the lining 77 forces the conveyed goods container 1 depends on the length of the lining 77. Depending on the length of the lining 77, the lining 77 is relaxed from a particular position, so that it then no longer makes any contribution to a position change. In addition, the center of gravity of the side wall elements 2, 6 lies in the direction of the fold axis K, in relation to the pivot axis 15, which also has the result that, when corresponding holding forces are removed, the conveyed goods container 1 returns to its loading position or its closed position. Its return to the closed position can additionally be assisted by an elongated spring element (not shown), preferably in the form of an S-shaped piece of spring steel strip. Such a spring element can be fastened at one end close to the fold axis K and at its other end to the frame middle region 12 of the hinged holding frame 9. A preliminary curvature of the spring element in the region of the fold axis is thereby preferably oriented with the convexity of the curvature towards the conveyed goods receiving region 60. By moving the first side wall element 2 from the closed position into the loading position or the unloading position, the fold axis K moves closer to the frame middle region 12 of the hinged holding frame 9. The spring element is thereby compressed, which, in the case of the configuration with preliminary curvature, leads to an increase in the convexity. The tension in the spring element has the result that the conveyed goods container 1 tends to return to its closed position. Preferably, the lining 77 is located on the spring element, so that it does not hang or hangs to a lesser degree into the conveyed goods receiving region 60.

FIG. 19 is a schematic front view of a further embodiment of a conveyed goods container 1. This further embodiment can be combined with all the other embodiments described. FIG. 19 shows some similar features and elements as FIG. 9, and these have been given the same reference numerals and will not be described in detail again here. In FIG. 19, the conveyed goods container 1 has a lug 80 with an opening 81. The lug 80 is fastened to the frame middle region 12 of the hinged holding frame 9, the lug 80 preferably being fastened centrally. The opening 81 has a rectangular profile. Preferably, the dimension of the opening in the height direction is larger than the dimension in the width direction. A hook 83 of the conveying means 71 engages into the opening 81, as a result of which the conveyed goods container 1 is suspended in the guide rail 19. Preferably, the hook 83 has a rectangular cross section in its bent region. Preferably, this cross section corresponds to the dimensions of the opening 81 except for a generously measured tolerance of a clearance fit. Owing to the rectangular cross section, or the rectangular opening, and/or owing to the larger dimensions in the height direction than in the width direction, the lug 80 and the hook 83 have only limited rotatability relative to one another in the plane of the first and second side wall elements 2, 6 in the closed position. As a consequence, the conveyed goods container 1 is not carried outwards by centrifugal force at curves in the suspended conveyor 19.

In the embodiments according to FIG. 1-19, the surfaces of the side wall elements 2, 6, or of the conveyed goods container 1, that are on the inside of the container in the unloaded state are shown substantially planar. According to further developments of the invention, at least the surface of one of the side wall elements 2, 6, and preferably of the first side wall element 2, that is on the inside of the container is formed with a structure of elevations and hollows, for example a studded structure.

FIG. 20 is a top view of an example of such a structure. There is shown the surface, located on the inside of the container, of the first side wall element 2 or, more precisely, of a layer of the first side wall element 2, located on the inside of the container, consisting preferably of foam or a similar plastics material, which surface forms a conveyed goods position fixing element 87. The conveyed goods position fixing element 87 is a convoluted foam with pyramid-shaped elevations 86 and intermediate hollows or depressions 88. The hollows 88 permit the gentle receiving of small conveyed articles that fit therein, which can be secured against sliding therein, even when the conveyed goods container 1 in question is transferred from its substantially horizontal loading position into the vertical transport position and is moved in a suspended conveyor. Larger conveyed objects are pressed gently by the convoluted foam, as a pressure element, against the opposite container inner side of the second side wall element 6 and are thus likewise prevented from slipping inside the conveyed goods container.

Structures of highs/lows other than the structure shown in FIG. 20 are, of course, suitable as the surface structure of the inside of the side wall elements 2 or/and 6.

FIG. 21 illustrates a further aspect of the present invention. It shows a top view of a compartment structure, on the inside of the container, of a first or second side wall element 2, 6 of a conveyed goods container 1 according to the invention, this compartment structure being similar to a seed tray compartment structure. The compartment walls 90 can be borders which project rigidly inwards from the rear wall 92. Alternatively, the compartment walls 90 can, however, be formed from a resiliently flexible material. The compartments 94 of different sizes allow conveyed objects of different sizes to be received, which at most can slide inside their compartment when the conveyed goods container 1 is closed. The compartment structure accordingly also represents a conveyed goods position fixing element 87, which can be provided on the first side wall or/and on the second side wall element 2, 6. The counterfaces of the respective other side wall element are in such a form that they cover the compartment structure in the closed state of the conveyed goods container.

The invention claimed is:

1. Suspended bag (1) as a conveyed goods container for transporting conveyed goods in a suspended conveyor, comprising:
 a first bag side wall (2) and a second bag side wall (6) which, facing one another, delimit between them a conveyed goods receiving region (60) and which are connected together in a folding connection region (62) such that they can be folded apart and folded together for opening and closing the conveyed goods receiving region (60); and a suspension element (9) for suspending the suspended bag (1) from a suspended conveyor in a transport position with the bag opening at the top;

wherein the first bag side wall (2) has at least a rigid edge contour region and is connected in that region to the suspension element 9) such that it is pivotable about a pivot axis which runs at least approximately horizontally in the transport position of the suspended bag (1); and wherein the second bag side wall (6) is connected to or can be acted upon by the suspension element (9) at a point that is remote from the pivot axis (15) and the folding connection region, so that, by pivoting the first bag side wall (2) about the pivot axis (15), the bag side walls (2, 6) can be folded apart and folded together.

2. Suspended bag according to claim 1, wherein the first bag side wall (2) comprises a tray with a tray plane (3) and is pivotably connected to the suspension element (9) at the tray, wherein the pivot axis (15) runs in the tablet plane (3) or in a plane extending parallel thereto.

3. Suspended bag according to claim 1, wherein the first bag side wall (2) and the second bag side wall (6) form a jaw-like opening (64) which merges in the folding connection region (62) into a bag pocket (66) which is otherwise enclosed at the sides.

4. Suspended bag according to claim according to claim 1, wherein the dimensionally flexible wall region is formed from a plastic material.

5. Suspended bag according to claim 1, wherein the suspension element (9) is in the form of a yoke-shaped frame with two yoke limbs (14) which receive the first bag side wall (2) between them and at which the suspension element (9) is connected to the first bag side wall (2) such that it is pivotable about the pivot axis (15).

6. Suspended bag according to claim 5, wherein the second bag side wall (6) is connected at its end remote from the folding connection region (62) (at 10) to a middle portion (12) of the yoke-shaped frame (9) provided between the yoke limbs (14).

7. Suspended bag according to claim 2, characterised in that the tray is dimensionally stable, and in that the second bag side wall (6) has a wall region which faces the tray of the first bag side wall (2) and has at least limited dimensional flexibility.

8. Suspended bag according to claim 7, wherein the dimensionally flexible wall region is formed from a dimensionally loose material, in particular a textile, or/and from a resiliently flexible material.

9. Suspended bag according to claim 1, comprising a position locking device (30, 40, 50) such that the suspension element (9) and the first bag side wall (2) can be reversibly locked relative to one another in terms of pivoting about the pivot axis (15).

10. Suspended bag according to claim 9, wherein the position locking device (30, 40, 50) is configured to release the locking between the first bag side wall (2) and the suspension element (9) when the suspended bag (1) is placed in its transport position on a support.

11. Suspended bag according to claim 1, wherein the first bag side wall (2) or/and the second bag side wall (6) comprises or is in the form of a conveyed goods position fixing element (87) for fixing conveyed goods in position in the conveyed goods receiving region (60).

12. Suspended bag according to claim 11, wherein the conveyed goods position fixing element (87) comprises a resiliently flexible pressure element which is intended and configured to exert a resilient holding pressure on the conveyed goods when the suspended bag (1) is closed and loaded with conveyed goods.

13. Suspended bag according to claim 12, wherein the conveyed goods position fixing element (87) has a compartment structure which is distributed over the first bag side wall (2) or/and the second bag side wall (6) and has depressions for receiving conveyed objects.

14. Suspended bag according to claim 11, the conveyed goods position fixing element (87) has on the inside of the suspended bag (1) a structure of elevations and hollows.

15. Suspended bag according to claim 14, wherein the structure of elevations and hollows is a studded structure.

16. Suspended bag according to claim 11, wherein the conveyed goods position fixing element (87) has a compartment structure which is distributed over the first bag side wall (2) or/and the second bag side wall (6) and has depressions for receiving conveyed objects.

17. Suspended bag according to claim 16, wherein the conveyed goods position fixing element (87) has on the inside of the suspended bag (1) a structure of elevations and hollows.

18. Suspended bag according to claim 17, wherein the structure of elevations and hollows is a studded structure.

19. Suspended conveyor (2) having at least one suspended bag and a guide rail arrangement (19) on which the suspended bag (1), guided in its transport and closed position, is movable, wherein the suspended bag (1) is to be opened from the transport and closed position while remaining on the guide rail arrangement (19), wherein, when the bag side walls (2, 6) are folded apart, the first bag side wall (2) is pivotable about the pivot axis (15) into an at least approximately horizontal loading position beneath the second bag side wall (6).

20. Suspended conveyor according to claim 19, wherein the first bag side wall (2) is pivotable beyond the horizontal loading position into an unloading position in which the first bag side wall (2) slopes downwards with its end remote from the folding connection region (62) bottommost, in order to allow conveyed goods located thereon to slide out of the suspended bag (1) when the suspended bag (1) is open.

21. Suspended conveyor according to claim 19, wherein the suspending bag comprises:

a first bag side wall (2) and a second bag side wall (6) which, facing one another, delimit between them a conveyed goods receiving region (60) and which are connected together in a folding connection region (62) such that they can be folded apart and folded together for opening and closing the conveyed goods receiving region (60); and a suspension element (9) for suspending the suspended bag (1) from a suspended conveyor in a transport position with the bag opening at the top;

wherein the first bag side wail (2) has at least a rigid edge contour region and is connected in that region to the suspension element (9) such that it is pivotable about a pivot axis which runs at least approximately horizontally in the transport position of the suspended bag (1); and wherein the second bag side wall (6) is connected to or can be acted upon by the suspension element (9) at a point that is remote from the pivot axis (15) and the folding connection region, so that, by pivoting the first bag side wall (2) about the pivot axis (15), the bag side walls (2, 6) can be folded apart and folded together.

\* \* \* \* \*